United States Patent [19]
Horenkamp et al.
[11] 3,764,750
[45] Oct. 9, 1973

[54] SWITCHING SYSTEM EQUIPPED FOR ONE-WAY LINE HUNTING

[75] Inventors: John Joseph Horenkamp, Freehold, N.J.; Henry August Meise, Jr.; George William Taylor, both of Boulder, Colo.

[73] Assignee: Bell Telephone Laboratories, Incorporated, Murray Hill, N.J.

[22] Filed: May 3, 1972

[21] Appl. No.: 250,072

[52] U.S. Cl. .......................... 179/18 HA, 179/18 AB
[51] Int. Cl. .............................................. H04q 3/62
[58] Field of Search .................. 179/18 HA, 18 AD, 179/18 AB

[56] References Cited

UNITED STATES PATENTS

| | | | |
|---|---|---|---|
| 3,697,700 | 10/1972 | Greason et al. | 179/18 AB |
| 3,626,378 | 12/1971 | Salle et al. | 340/172.5 |

*Primary Examiner*—Thomas W. Brown
*Attorney*—W. L. Keefauver et al.

[57] ABSTRACT

A wired logic scanner controlled switching system is disclosed equipped for one-way hunting of lines subdivided into hunting groups. When a call is directed to a busy line, another line in the same group is selected under the joint control of a priming potential received from the called line and scanning signals generated by hunting circuitry.

15 Claims, 25 Drawing Figures

INVERTING AND GATE

NON-INVERTING AND GATE

INVERTING OR GATE

NON-INVERTING OR GATE

FLIP-FLOP

FLIP-FLOP

MODE CONTROL

SWITCHING SYSTEM EQUIPPED FOR ONE-WAY LINE HUNTING

BACKGROUND OF THE INVENTION

1. Field of the Invention

This invention relates to a telephone switching system and, in particular, to a system suitable for use as a private branch exchange. This invention further relates to a switching system equipped with line hunting facilities.

2. Description of the Prior Art

It is desirable to equip certain types of switching systems, such as private branch exchanges (PBXs), with hunting facilities so that a call directed to a busy line may be completed to a preselected alternate line. Systems equipped with line hunting facilities are known. In these, line hunting may be limited to a single alternate line. Alternatively, it may include a plurality of lines which may be hunted sequentially until an idle line is found or until all lines of the hunting group are determined to be busy. The prior art hunting arrangements include those in electromechanical type systems as well as those in wired logic electronically controlled systems. The hunting facilities of the electromechanical systems require the use of special, complicated, and expensive circuitry in the common control elements, such as markers, etc. The hunting arrangements of the wired logic electronically controlled systems require the addition of complex and expensive equipments, including a modified switching network, as in Greasom-Weimer Patent Application Ser. No. 100,315, filed Dec. 21, 1970 now U.S. Pat. No. 3,697,700, issued Oct. 10, 1972. Although such arrangements adequately perform their intended function, their cost and complexity tends to limit the number of applications in which line hunting can be economically justified.

BRIEF SUMMARY OF THE INVENTION

It is, therefore, an object of the invention to provide improved line hunting circuitry in a switching system.

It is a further object to provide line hunting facilities that do not unduly increase the system cost or complexity.

SUMMARY DESCRIPTION

In accordance with our invention, we provide facilities which permit a system to be equipped for line hunting with a minimum of added cost and complexity. Our invention is disclosed as embodied in a system in which scanning or code leads interconnect a line scanner with digit registers and line circuits. The line circuits are subdivided into hunting groups and the line circuits comprising each group are connected to form a predetermined hunting sequence.

In completing a call, a register receives the called number from the calling line and, in turn, gates signals representing the called number onto the code leads. The called line circuit responds to the code lead signals and transmits a reply signal to a system system controller indicating whether the line is currently idle or busy. If the line is idle, the call is completed to it in the normal manner. If the line is busy, specially provided memory circuitry in the called line circuit responds to the code lead signals and applies an enable or priming potential to the next line circuit in its hunting group. This potential is applied over a strap that interconnects the two line circuits. The priming potential is also applied to the system controller to advise it that hunting is permitted on the call. The system controller then removes the register output from the code leads and the scanner hunts to the primed line circuit by applying scanning signals to the code leads. The memory circuitry in the called line circuits maintains the priming potential on the next line circuit after the register output signals identifying the called line circuit are removed from the code leads.

When the primed line circuit is scanned, it transmits a signal back to the controller to stop the scanner and to indicate its current idle-busy state. If the newly scanned line is idle, the call is completed to it. This is done by applying the scanner output signals on the code leads to the network controller to identify the line circuit. Alternatively, if the newly scanned line circuit is busy, it returns a signal to this effect to the controller and, at the same time, primes the next line circuit in its hunting group. This causes the system to continue its hunting operation in an attempt to complete the call.

The hunting operations continue in the manner described until either an idle line is found or, alternatively, until all lines following the called line in the hunting sequence are determined to be busy. In that event, the calling line is connected to a busy tone source to indicate that the call cannot currently be completed.

A feature of our invention is the provision in a switching system of line hunting facilities which cause a busy line circuit to which a new call is directed to apply a priming potential to another line circuit to which the call should next be directed.

A further feature is the provision of hunting facilities exclusive of thee network, which facilities, during the serving of a call directed to a busy line, apply a priming potential from the called line circuit to an alternate line circuit to which the call may then be directed under control of a line scanner.

A further feature is the provision of line hunting facilities which, during the serving of a call directed to a busy line, directs the call to an alternate line under the coadjuvant control of a scanner and a priming potential applied by the busy called line circuit over a path exclusive of a switching network to the alternate line circuit.

A further feature is the provision of a two-state memory device in each line circuit, circuitry for switching the memory device of a busy called line circuit from a first to a second state when the system is required to hunt from the called line to an alternate line, and circuitry for holding the memory device of the called line circuit in a set state during the hunting operation for maintaining a priming potential on the alternate line.

A further feature is the provision of a system having line circuits, code leads which connect the line circuits to a scanner, circuitry for applying called number information to the code leads to attempt to extend a call to a called line, circuitry for removing the called line number from the code leads if the called line is busy and for applying scanner output signals to the code leads, circuitry exclusive of the switching network of the system for applying a priming potential from the called line circuit to an alternate line circuit to which the call should next be directed, and circuitry for extending the call to the alternate line under coadjuvant control of the code lead scanning signals and the priming potential from the called line circuit.

A further feature is the provision of facilities for testing the current busy-idle state of each hunted line, for extending a call to a hunted line found to be idle and, if the hunted line is busy, for hunting other lines sequentially one at a time under the coadjuvant control of the scanner output signals and a priming potential applied from each hunted line that is found to be busy to the next line that is to be hunted.

DESCRIPTION OF THE DRAWING

These and other objects and features of the invention will become more apparent upon the reading of the following description thereof taken in conjunction with the drawing in which FIG. 1A, 1B, 1C, and 1D, when arranged as shown on FIG. 1E, disclose a specific illustrative embodiment of our invention.

GENERAL DESCRIPTION - FIG. 1A, 1B, 1C, AND 1D

Figures 1A, 1E:
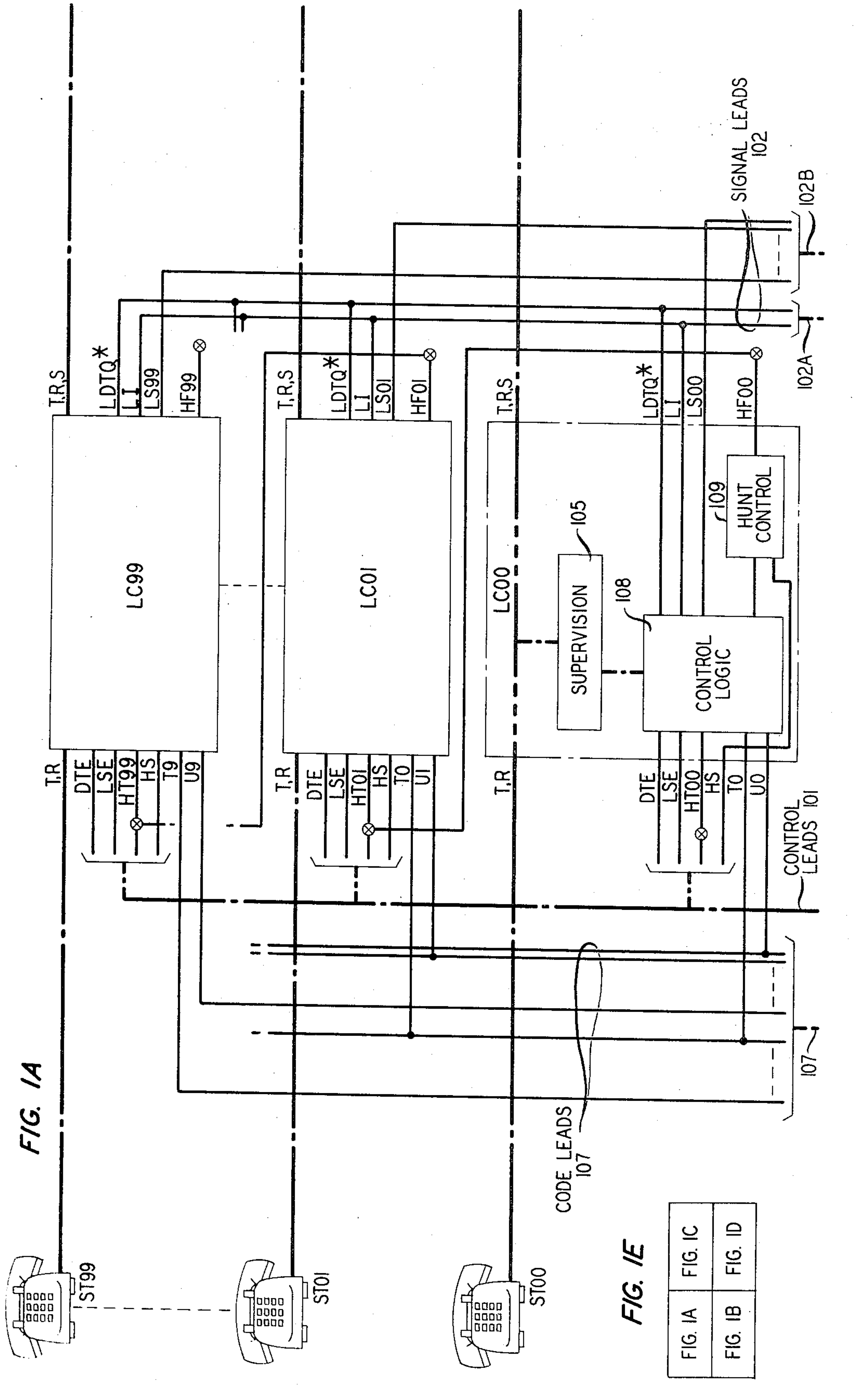
Figure 1B:
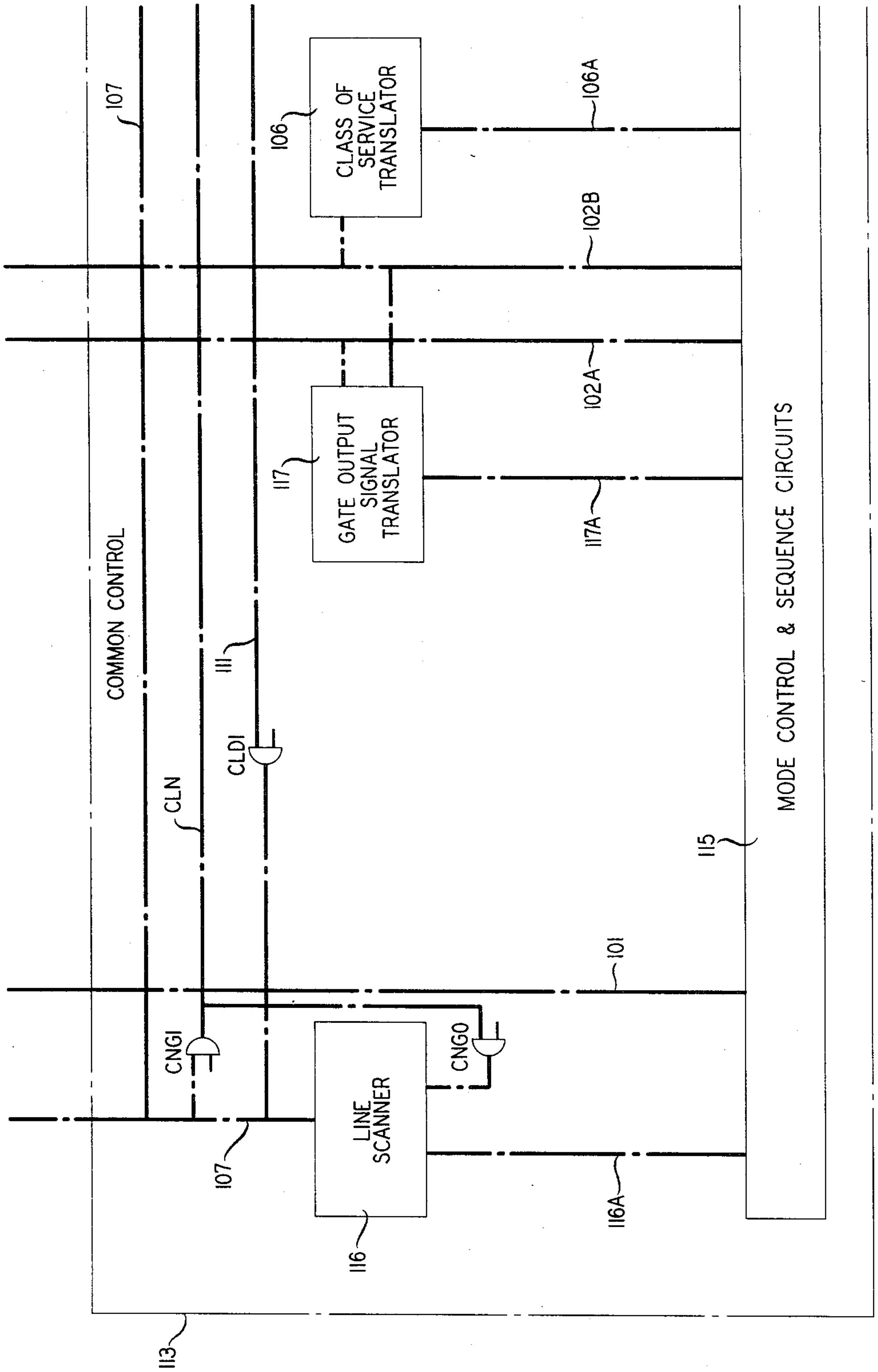
Figure 1C:
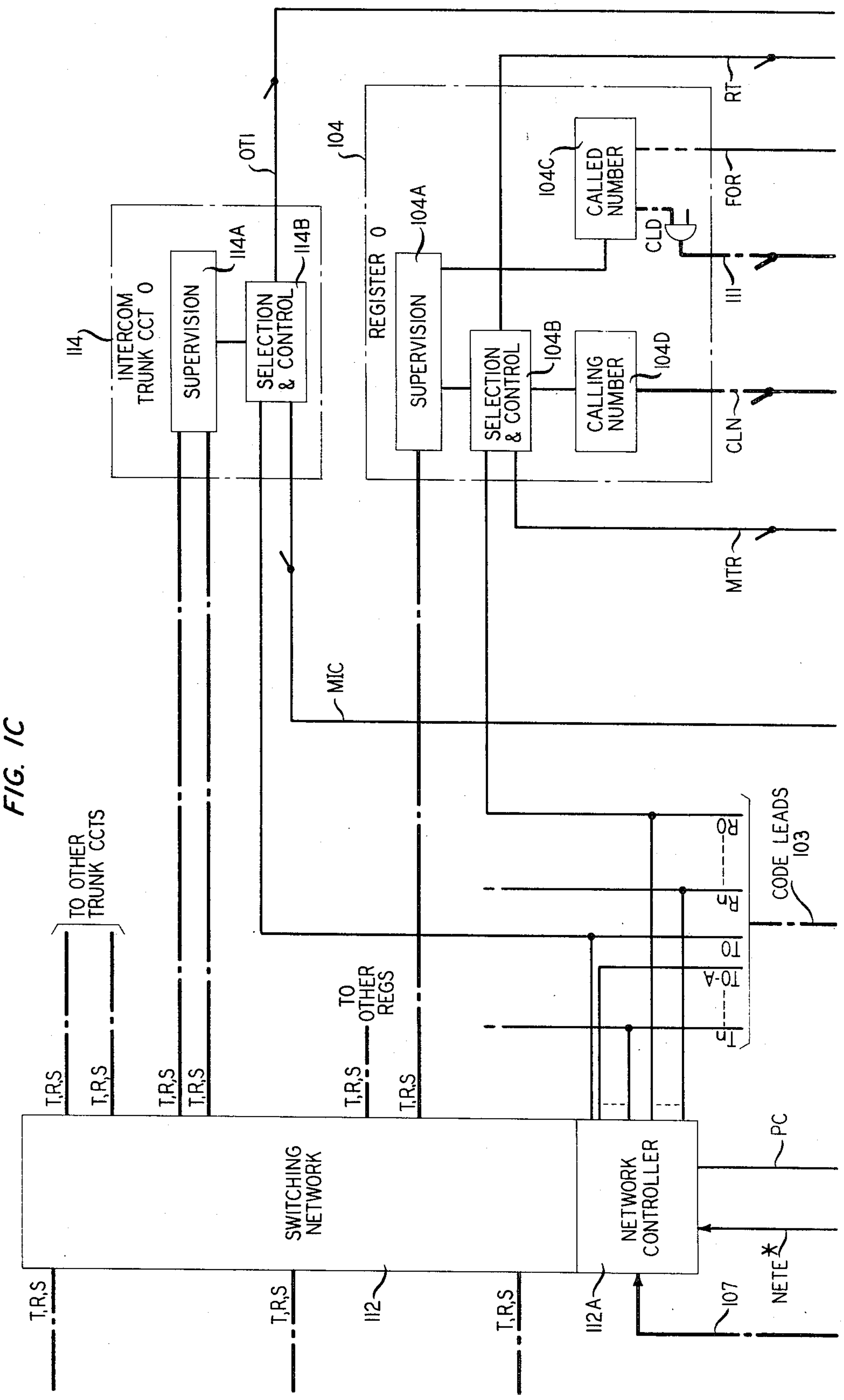
Figure 1D:
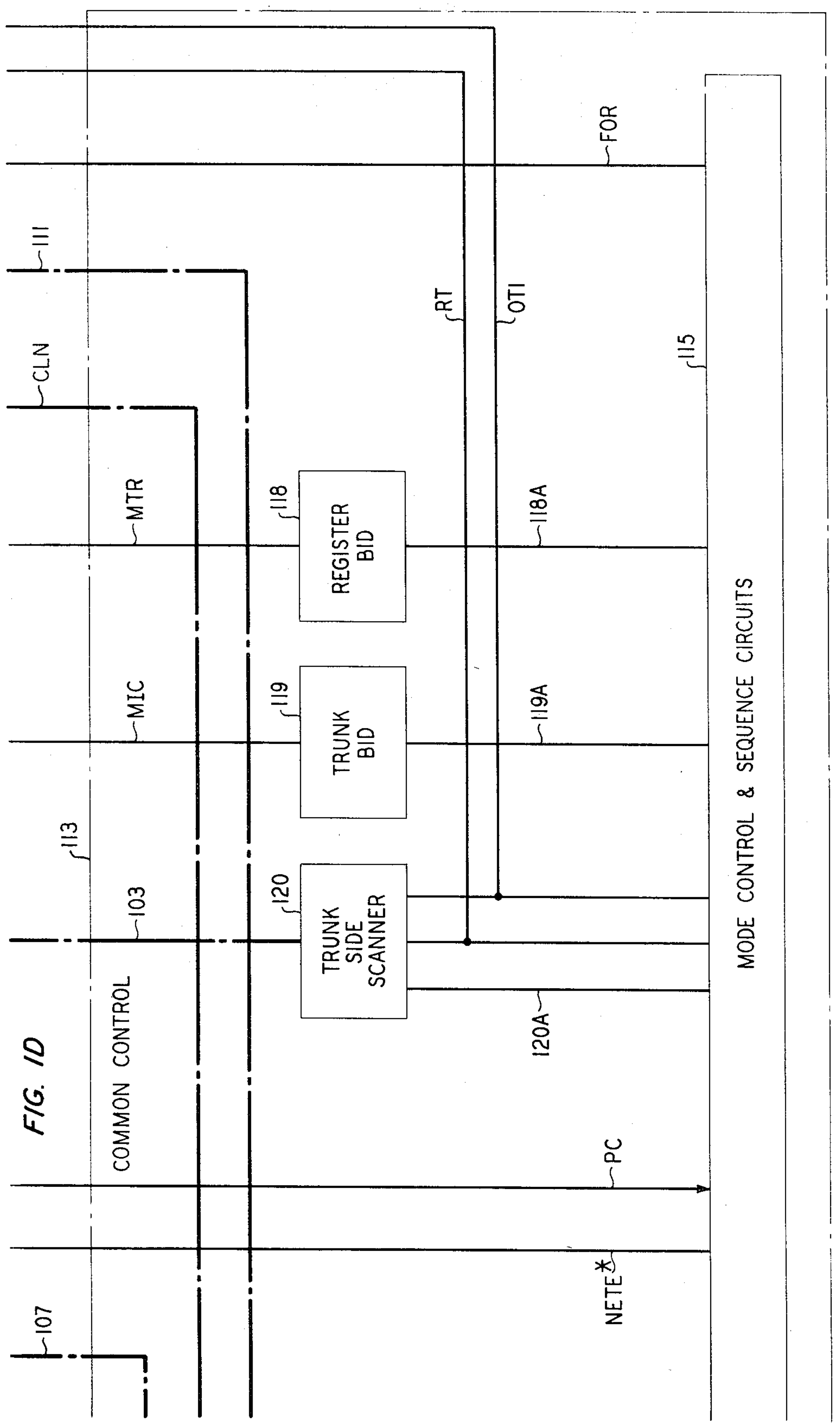

FIG. 1A through 1D, when arranged with respect to each other as shown in FIG. 1E, disclose a specific embodiment of our invention. The invention is disclosed as embodied in a wired logic, electronically controlled type PBX that is similar to that disclosed in detail in the U.S. Pat. No. 3,377,432 to H. H. Abbott et al. of Apr. 9, 1968. The Abbott et al. specification is hereby incorporated as a part of the present specification to the same extent as if fully set forth herein.

The system comprising our invention includes a switching network 112 including a network controller 112A. If desired, the network may be of the well-known crossbar switch type. The paths that are established are controlled by signals transmitted from the rest of the system over conductors 103 and 107 to the controller 112A. The system further includes a plurality of stations ST00 through ST99 each of which is connected to one of line circuits LC00 through LC99. Each line circuit is connected by various conductors to common control 113 on FIG. 1B. These conductors include a set of code leads 107, control leads 101, and signal leads 102. Each line circuit is also connected by the code leads 107 to the network controller. As subsequently described, the code leads 107 together with the control leads 101 enable the common control to scan, identify, and select any line circuit; the leads 102 permit common control to receive signals from the line circuits indicating their current conductive states as well as other useful information.

The disclosed embodiment also includes a plurality of circuits which are connected to the right or trunk side of switching network 112. These circuits include intercom trunk circuits 114, of which only one is shown, as well as register circuits 104, of which only one is shown. Only a single trunk circuit and a single register are shown in order to minimize the complexity of the drawing and to facilitate an understanding of the invention. The trunk side network connections to the other registers, the other intercom trunk circuits, as well as the other types of trunk circuits that would normally be provided in a PBX, are represented by the dashed conductors extending to the right from network 112 on FIG. 1C. The signals that are required to control the network in establishing a connection between a selected line side and a selected trunk side circuit are applied to controller 112A from the line side over path 107 and to the trunk side over path 103.

The disclosed system is of the common control type in which common control 113 governs the order in which the various circuits are interconnected via the network during the serving of each call. Common control receives call service requests from line circuits, from registers, and from the trunk circuits. Upon the receipt of each request, common control sets its mode control and sequence circuits 115 to a state unique to the request. Common control regulates the operation of the requesting circuit, as described in the Abbott et al. patent, and controls the establishment of a network connection between the requesting circuit and any circuit of the system with which the requesting circuit must be connected. The serving of a call may require a plurality of network connections to be established sequentially.

Each line circuit includes a control logic element 108 which comprises a plurality of transistor gates which are selectively controlled to assume either an ON or an OFF conductive state. A gate is said to be ON whenever it receives an energizing potential at its input (its base), and said to be OFF when energizing potentials are not applied to all of its inputs. The conductive state of the line circuit gates is jointly controlled by the supervision circuit 105 within each line circuit, by the code leads 107, and by control leads 101. The code leads 107 extend from the line circuits to a line scanner 116 within common control; they further extend to registers 104. As is subsequently described, the code leads receive signals at certain times from scanner 116 and at other times from the register.

Signals indicating the conductive states of the line circuit gates are transmitted over signal leads 102 to common control. These signals enable common control to monitor the state of the line circuits and, by means of prewired logic, to determine whether a line circuit requires action by common control with regard to either a call initiated by or directed to the line circuit.

Included among the functions performed by common control in connection with the establishment of calls are the recognition of a service request from a calling line circuit when it initially goes off-hook, the identification of the calling line circuit so that it may be connected to a register, the selection of a called line circuit following the reception of a called number by the register, the selection of a trunk circuit for interconnecting the calling and called stations, and the reidentification of a calling line circuit at the time it is to be connected to the selected trunk circuit and, in turn, to the called line circuit.

Line scanner 116 has a plurality of output positions which are connected over separate ones of the code leads to the line circuits. The code leads are designated UO through U9 and T0 through T9 and each line circuit is connected to a unique combination of code leads in such a manner that the numerical designation of a line circuit indicates the code leads to which it is connected. Thus, line circuit 00 is connected to code leads U0 and T0; line circuit 99 is connected to code leads U9 and T9.

Common control also includes a class of service translator 106 and a gate output signal translator 117. Translator 117 is connected to signal leads 102A and 102B; translator 106 is connected only to signal leads 102B. Translator 117 translates the signals received from the line circuit gates and informs common control regarding line circuits that require further call service. Translator 106 receives output signals from the line circuits and generates class of service information to indicate the type of call service to which the calling line is entitled.

Common control also includes a register bid circuit 118, a trunk bid circuit 119, and a trunk side scanner 120. The function of these circuits is to select an idle register or an idle trunk circuit when the services of either of these circuits is required on a call.

SPECIFIC DETAILED DESCRIPTION - FIG. 1A, 1B, 1C, AND 1D

The following describes the operation of the system of FIG. 1 in connection with the serving of a call initiated at station ST00 and directed to station ST99.

The off-hook condition at station ST00 is detected by supervision circuit 105 of line circuit LC00. This circuit, in turn, activates control logic 108 which transmits a signal over conductor LDTQ and path 102A to translator 117 and mode control and sequence circuits 115 within common control. The receipt of this signal causes common control to go into what is termed the "line dial tone mode" and to apply an enable potential to control lead conductor DTE which extends to the control logic 108 of each line circuit. The receipt of this signal also causes common control to activate the line scanner 116 over path 116A. The scanner now begins a stepping or counting operation in which it applies enable potentials to different combinations of the T- and U- code lead scanning conductors.

The scanner has stepping or counting positions individual to each line circuit. When the scanner steps to a position associated with a particular line circuit, it applies enable potentials to the U- and T- conductors to which the line circuit is connected. Thus, when line circuit LC99, for example, is scanned, enable potentials are applied to code lead conductors U9 and T9.

No line circuit other than LC00 is assumed to be in a newly initiated off-hook state. Therefore, the scanning of all line circuits other than LC00 produces no change of state in their logic circuit gates. However, when the scanner advances to its position 00, it applies enable potentials to conductors TO and UO to scan line circuit LC00. The simultaneous application of potentials to conductors DTE, UO, and TO, as well as the receipt of enable potentials from supervision circuit 105, activates the control logic 108 of line circuit LC00 and causes it to apply a change of state signal to its conductor LS00. This signal is applied over path 102B to the class of service translator 106, to the gate output signal translator 117, as well as to the mode control and sequence circuits 115. In response to the receipt of this signal, common control applies a signal over conductor path 116A to stop the line scanner in its position associated with line circuit LC00.

As described in the Abbott et al. patent, common control now initiates the sequence of circuit actions required to select an idle register and to connect it to the calling line circuit. The trunk side scanner 120 has an operative position for each register and trunk circuit. It also has an output conductor that extends from each of its positions to the register or trunk circuit with which the position is associated. The output conductors of this scanner are designated RO through RN and TO through TN. The R- conductors extend to the registers; the T- conductors extend to the trunk circuits. Thus, conductor RO extends from the scanner to register 0; output conductor TO extends from the scanner to intercom trunk circuit 0.

The mode control and sequence circuits 115 initiate the selection of a register by applying potentials to conductors 120A and 118A. These conductors extend from the mode circuit to the trunk side scanner 120 and to the register bid circuit 118, respectively. The register bid circuit responds to the signal on conductor 118A and applies an enable potential to conductor MTR which extends to the selection and control element 104B within each register.

A register can be selected only when its selection and control circuit simultaneously receives a potential on conductor MTR, a potential on its R- scan conductor, and a signal from its supervision circuit indicating that the register is idle. Thus, if register 0 is currently idle, its supervision circuit applies a signal to the selection and control circuit at the same time the register bid circuit applies a signal to conductor MTR. This leaves the conductive state of circuit 104B under control of the potential on scan conductor RO.

The signal on conductor 120A activates scanner 120. When register 0 is scanned, a signal is applied to conductor RO which causes the selection and control circuit to change state and apply a stop scan signal to conductor RT. This signal extends back to the trunk side scanner 120 to stop it in its operative position associated with register 0. The signal on conductor RT also advises common control that an idle register has been selected and that the next sequence of operations required to serve the call may be initiated.

At this stage of the call, line scanner 116 is in its operative position associated with the calling line circuit and the trunk side scanner is in its operative position associated with register 0. Thus, the signals now applied to code leads 107 identify the calling line circuit; the signals applied to code leads 103 identify the selected register. Since code leads 107 extend to the line side of the network controller and since code leads 103 extend to the trunk side of the network controller, this circuit receives the signal information that identifies calling line circuit LC00 and the register 0. Common control at this time applies an enable signal to conductor NETE which extends to the network controller. This signal and the code lead signals cause the network to establish a path between line circuit LC00 and register 0.

Common control next activates gate CNGI. This applies the calling line information on code leads 107 to conductor CLN which extends to all registers. Element 104D in register 0 registers this information, under control of circuit 104B, for later use on the call. Common control then releases line scanner 116 and trunk side scanner 120 so that they may be used on other calls.

It is assumed that the present call is directed to station ST99. This being the case, the calling party dials the digits 99 which are received by the register and stored in its element 104C in the conventional manner. The register applies a signal to conductor FOR when all the digits required to serve the call have been dialed. This signal advises common control that the next sequence of circuit actions required for the call may now be initiated.

The receipt of the signal on conductor FOR causes the mode control to go into what is termed the "read register mode" in which the dialed digits representing the called station information are read out of the register to identify and select the called station. Gate CLD1 is activated to gate the called number digits (99) onto code leads T9 and U9. Simultaneously, common control applies an enable potential to conductor LSE extending to all line circuits. The control logic element 108 of line circuit LC99 is activated at this time since both of its code leads U9 and T9 and conductor are enabled. The line circuit responds to these signals and applies an output signal to conductor LI which extends back to common control to advise it whether the line circuit is currently idle or busy. An output signal is also applied by the line circuit to its conductor LS99 which extends to class of service translator 106 to cause that circuit to generate class mark information.

Let it be assumed that station ST99 is idle. In this case, common control initiates the sequence of circuit actions required to select an idle intercom trunk circuit for use in interconnecting the calling and called line circuits. Let it be assumed that intercom trunk circuit 0 is idle and is selected for use on this call.

The selection of this circuit is controlled by its selection and control circuit 114B under joint control of signals received from its supervision circuit 114A, from conductor MIC, and from its scan conductor TO. At this time, common control applies a signal to path 119A to cause the trunk bid circuit 119 to enable conductor MIC extending to all trunk circuits. Common control also activates the trunk side scanner 120 so that it begins a scanning operation to select an idle trunk circuit. When trunk circuit 0 is scanned, the potential on conductor TO activates the selection and control circuit 114B which, in turn, applies a signal over conductor OT1 extending back to common control to stop the scanner in its operative position associated with trunk circuit 0. The receipt of the signal on conductor OT1 also advises common control that an idle trunk circuit has been selected.

Gate CLD1 remains enabled and continues to apply the called number information to the code leads 107. The trunk side scanner is currently in its position unique to the selected trunk circuit. This being the case, the network controller receives code lead signals identifying both the called station and trunk circuit 0. Common control at this time applies an enable potential to conductor NETE to cause the controller to establish a network path between called line circuit LC99 and intercom trunk circuit 0. The network advises common control by a signal applied to conductor PC when the path is established.

After the called line circuit is connected to intercom trunk circuit 0, common control initiates the circuit actions required to reidentify the calling line circuit so that it may also be connected to trunk circuit 0. It has already been described how the calling line number information on code leads 107 was stored in the register following the scanning of line circuit LC00. Common control now activates gate CNGO to gate the calling number from conductor CLN into line scanner 116 to force it to its operative position associated with calling line circuit LC00. Common control also applies an enable signal to conductor LSE extending to all line circuits. This activates the control logic element 108 for line circuit LC00 since conductors UO and TO are now enabled from the scanner under the control of signals applied to it by gate CNGO. Element 108 now applies an answer signal to conductor LS00 extending back to common control and the class of service translator 106. The class of service information generated by translator 106 indicates to common control whether the calling line circuit is entitled to initiate the type of call service being requested.

The signals on code leads 107 are also applied to the left side of the network controller. The trunk side scanner advances to its position TO-A which is also associated with the selected trunk circuit. The network now releases its connection between the calling line circuit and the register and re-establishes a new connection between the calling line circuit and the second network appearance of the selected trunk circuit. The calling and called stations are connected speechwise upon the establishment of this path.

Description of a Call Directed to a Line Equipped for One-Way Hunting

Let it be assumed for the purposes of this description that a call is originated at station ST99 and is directed to station ST00. Let it also be assumed that station ST00 is currently busy and that the hunting facilities are connected so that the system will attempt to route the call to station ST01 whenever station ST00 is busy.

Each line circuit is equipped with a hunt control element 109 as shown for line circuit 00. The hunt control element receives input signals from control logic 108 and from conductor HS; it provides output signals to the HF— terminal of its line circuit such as, for example, terminal HF00 for line circuit 00. A conductor or strap is run from terminal HF00 to the HT— input of the line circuit to which hunting is to be directed. Terminal HF00 is shown connected to terminal HT01 of line circuit LC01. This causes the system to attempt to route a call to line 01 whenever line 00 is busy.

The call directed to line 00 from line 99 is served in the manner similar to that already described except that when the register reads out the called number onto code leads 107, the control logic 108 for line circuit LC00 applies a busy signal, rather than an idle signal, to conductor LI. This busy signal is applied over path 102A to common control to advise it that the called line is busy. Also, the hunt control element 109 of line circuit LC00 applies a signal to its conductor HF00, and from there by means of the strapping to terminal HT01 of line circuit LC01. This signal is also applied over conductor HT01 back to common control to advise it that line 00 is in a hunting group and that an attempt should be made to route the call to the next idle line of the group. In response to the receipt of this signal, common control applies a signal to the HS inputs of all line circuits and, at the same time, applies a signal to conductor LSE to inhibit the control logic of all line circuits other than LC01. The signal on conductor HS controls the conductive state of the hunt control element 109 so that the hunt signal is maintained on terminal HF00 when the line hunting operation begins under control of the scanner. Next, common control gates the called number 00 off of the code leads 107 and a line scanning operation begins in which the line scanner steps sequentially through its various positions as already described. When the scanner steps to its position associated with line circuit LC01, it applies scanning potentials to conductors TO and U1. These potentials and the hunt signal on terminal HT01 together activate the control logic of line circuit LC01 to test its current busy-idle state.

The activation of the control logic of line circuit 101 causes a response signal to be applied to conductor LI to indicate to common control whether the line is busy or idle. If the line is idle, the call is extended to it in the same manner as already described. If it is busy, terminal HF01 is activated and common control continues the hunting sequence in an attempt to route the call to the line circuit to which terminal HF01 is connected. If terminal HF01 is not connected to another line circuit, thereby indicating that no further hunting is permitted, the call will be routed to a busy tone source as subsequently described in detail.

Logic Circuits - FIG. 3A Through 3G

The system embodying our invention makes extensive use of logic elements such as AND gates, OR gates, inverting AND and inverting OR gates, flip-flops, etc. The complexity of the drawing has been reduced by representing such elements with symbols indicating their logical functions, rather than by disclosing circuit details everywhere each such element appears on the drawing. Even though these logic symbols are well known to those skilled in the art, FIG. 3 discloses the details of the more commonly used logic elements in our system.

Figure 3A:
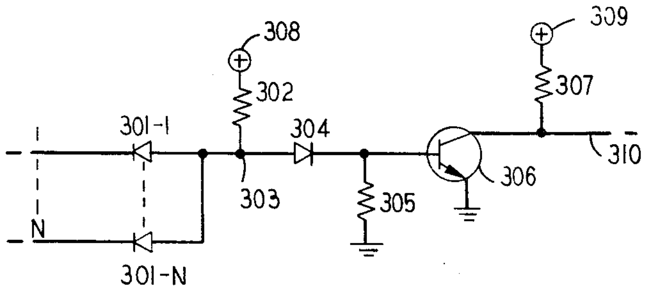
FIG. 3A, 3B, 3C, 3D, 3E, 3F, and 3G illustrate additional details of the logic elements shown on the drawing.
Figure 3B:
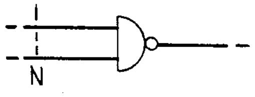

FIG. 3A discloses the circuit which comprises the basic element of many of our logic circuits. This circuit comprises an AND NOT gate, commonly referred to as an AND or inverting AND gate. The circuit may also be operated as an inverting OR gate in the manner subsequently described. The circuit may be functionally divided into an AND gate and an inverting amplifier. The AND gate comprises diodes 301–1 through 301–N, together with resistor 302 and positive potential source 308. The inverting amplifier comprises diode 304, resistors 305 and 307, and transistor 306. The operation of the AND gate is such that terminal 303 may go positive only when all of inputs 1 through N are raised above ground potential. The holding of one or more inputs at ground or negative potential prevents terminal 303 from going positive. The inverting transistor amplifier 306 is turned OFF except when it receives a base current from source 308 via resistor 302 and diode 304. Source 308 is effective to supply base current to the transistor only when terminal 303 goes positive as all of the inputs 1 through N are driven positive. The turn-ON of the transistor at this time lowers the potential on output conductor 310 from that of the positive source 309 to a lesser potential as determined by the IR drop across resistor 307.

It may be seen from the foregoing that the circuit of FIG. 3A operates in such a manner that positive signals on all inputs turn the transistor ON and produce a negative-going signal at its output. Conversely, the grounding of at least one input prevents the transistor from turning ON even though the remainder of the inputs are positive. This circuit may be operated as an AND NOT circuit by normally maintaining one or more of its inputs low, i.e., ground, and by subsequently driving all of its inputs HIGH for the AND condition of the circuit. When the circuit of FIG. 3A is operated as an inverting AND gate in our system, it is represented on the drawing by the symbol shown in FIG. 3B.

Figure 3C:
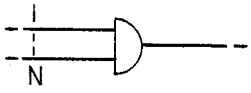

Noninverting AND gates are represented on the drawing by the symbol shown on FIG. 3C. This symbol differs from that of 3B in that the output conductor is directly connected to the semicircle representing the gate, rather than being connected to it by the small circle of FIG. 3B. The noninverting AND gate of FIG. 3C may be of any type well known in the art. For example, it could, if desired, be the inverting AND gate of FIG. 3B followed by an inverter.

Figure 3D:
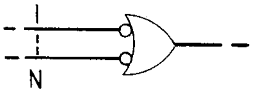
Figure 3E:
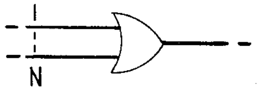

The circuit of FIG. 3A may be operated as an inverting OR gate by normally maintaining all inputs above ground and by subsequently driving at least one input to either ground or to a negative potential to represent the OR condition. The symbol shown on FIG. 3D is used whenever the circuit of FIG. 3A is operated as an inverting OR gate. The symbol shown on FIG. 3E is utilized to represent the noninverting OR gates. These OR gates may be of any type well known in the art, such as for example, the inverting OR gate of FIG. 3D with an inverter in each of the input leads.

Figure 3F:
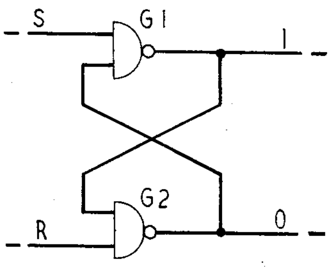
Figure 3G:
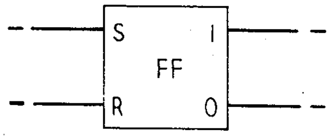

Flip-flops are constructed by cross-connecting two inverting AND gates as shown in FIG. 3F. These flip-flops are represented by the symbol shown on FIG. 3G. The circuit of FIG. 3F operates as follows: The bias circuit for the gate holds inputs S and R HIGH when the flip-flop is quiescent. Assume at this time that the transistor in gate G1 is OFF while that in gate G2 is ON. In this case, the output 1 is HIGH since its transistor is cut OFF; output 0 is low since its transistor is ON. Input signals applied to the S conductor at this time are ineffective to change the state of its transistor since the low on the cross-connected input from the output of gate G2 keeps the G1 gate turned OFF. However, a negative-going pulse applied to the R input at this time removes the base drive for the transistor in gate G2. This turns the gate OFF and drives its 0 output HIGH, which is cross-connected to the input of gate G1 to turn it ON and drive its output LOW.

Sequence Circuits - FIG. 4A Through 4D

The system embodying our invention makes extensive use of sequence circuits. In particular, the common control portion of the system contains a plurality of sequence circuits whose function is to apply signals or control potentials to various portions and circuit elements of the system in a predetermined sequence. The complexity of the drawing has been reduced by representing the sequence circuits with symbols indicating their logical function, rather than by disclosing circuit details everywhere a sequence circuit appears on the drawing.

Figure 4A:
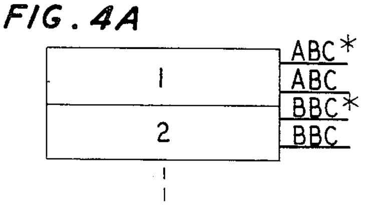
FIG. 4A, 4B, 4C, and 4D illustrate additional details of the sequence circuit shown on the drawing.

We use two types of sequence circuits in our system. The type shown in FIG. 4A has a plurality of stages or elements of which two are shown and are designated 1 and 2. This type of sequence circuit, once it is activated, automatically steps from element to element without any response from the system. The circuit details of the sequence circuit of FIG. 4A are shown on FIG. 4B. The sequence circuit of FIG. 4C is similar to that of FIG. 4A, except that it does not step from element 3 to element 4 until it receives a system response on conductor RBC. FIG. 4D illustrates the circuit details of the circuit of FIG. 4C.

Figure 4B:
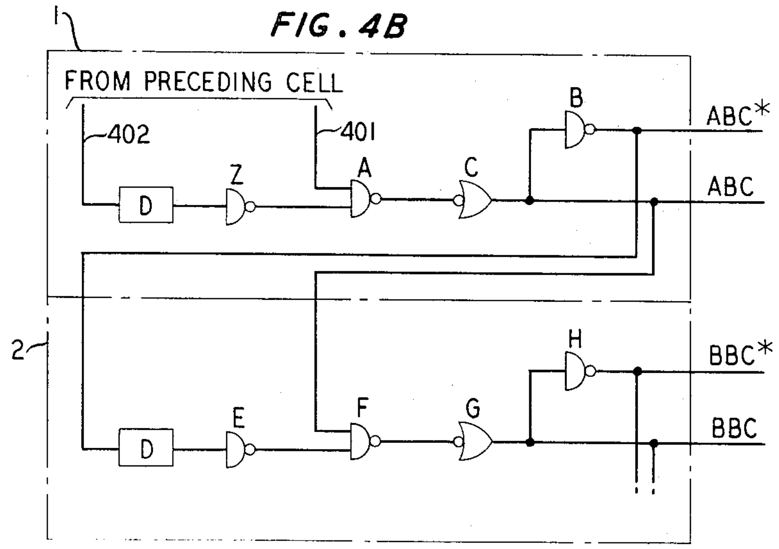
Figure 4C:
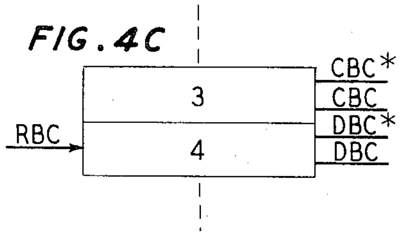
Figure 4D:
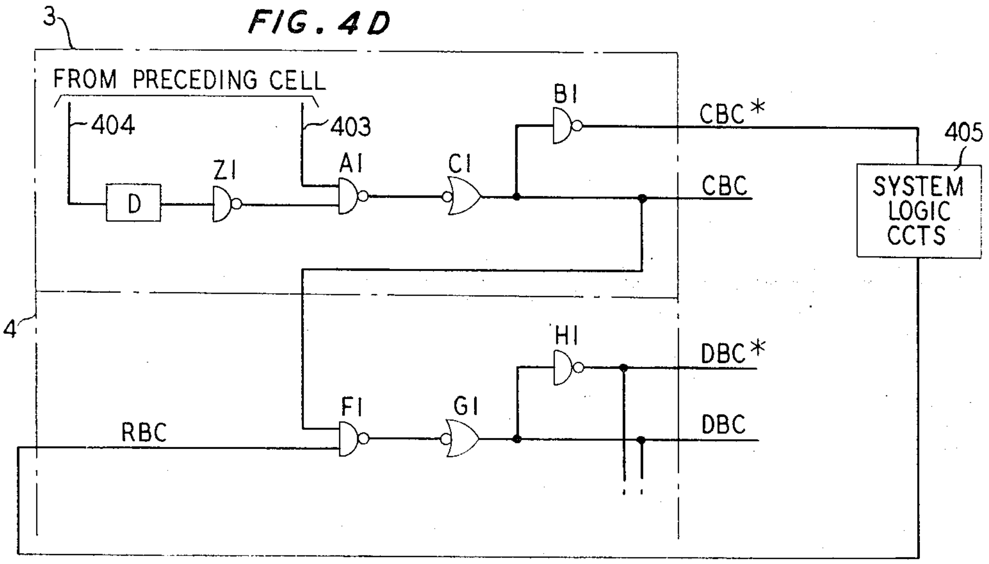

The following describes the operation of the sequence circuits of FIG. 4B. Stage 1 is enabled when both inputs of gate A go HIGH. The upper input of gate A is driven HIGH by a potential applied to conductor 401 from the preceding stage. A LOW on conductor 402 from the preceding stage is propagated, after a predetermined delay, through delay element D, applied to the input of inverting OR gate Z, and applied as a HIGH to the lower input of gate A.

Gate A turns ON and drives its output LOW when both of its inputs go HIGH. The LOW on its output turns OFF gate C and drives conductor ABC HIGH. The HIGH from gate C turns ON gate B and drives conductor ABC* LOW. The potentials on conductors ABC and ABC* are applied to other elements of the system to control those elements in the performance of their assigned system functions. The potentials on these two conductors also extend to stage 2 of the sequence circuit to activate it in a manner analogous to that already described for stage 1. Specifically, the upper input of gate F is HIGH at this time from conductor ABC. The lower input of gate F is driven HIGH, after a predetermined delay, in response to the LOW on conductor ABC*. The purpose for the delay is so that the outputs from the first and second stages of the sequence circuit will have a predetermined sequence in time. When gate F turns ON after the predetermined delay, gate G turns OFF and drives conductor BBC HIGH and drives conductor BBC* LOW from gate H. This delay insures that conductors ABC and ABC* assume their active state and then, after a predetermined time, conductors BBC and BBC* will assume their active state as gates G and H respond to the turn-ON of gate F when both of its inputs go HIGH.

Conductors BBC and BBC* extend both the next stage of the sequence circuit as well as to other elements of the system to control them in the performance of their system functions. The next stage of the sequence circuit is activated by the potentials on conductors BBC and BBC* in a manner analogous to that already described for elements 1 and 2.

The sequence circuits of FIG. 4A and 4B, as well as those of 4C and 4D, operate in such a manner that the output conductors of an activated stage remain enabled with a HIGH or a LOW potential, as the case may be, when the sequence circuit steps to the next position to activate it. In other words, after the output conductors of a stage are enabled, they remain enabled when the sequence circuit steps through the remainder of its positions. The output conductors of each stage are disabled or reset to their normal state only when the enable potentials are removed from the control gate of the first stage; namely, the gate that corresponds to gate A of stage 1. The turn-OFF of that gate disables the outputs of all other stages of the sequence circuit.

The following describes the operation of the sequence circuit of FIG. 4C and 4D. Stage 3 operates in the same manner as described for stages 1 and 2 of FIG. 4B. Namely, both inputs of gate A1 go HIGH; its output goes LOW; the output of gate C1 goes HIGH to conductor CBC; and the output of gate B1 goes LOW to conductor CBC*.

The output of gates B1 and C1 are connected to element 405 which is entitled "System Logic Circuits." The output of gate C1 also extends to the upper input of gate F1. Element 405 receives the control potentials on conductor CBC*, performs its assigned system function, and then transmits a signal over conductor RBC to the lower input of gate F1. The receipt of this signal indicates that the system function assigned to element 405 has been completed and that the sequence circuit may now step from position 3 to position 4. The simultaneous application of signals to the lower and upper inputs of gate F1 turns the gate ON, turns gate G1 OFF, and gate H1 ON. This drives conductors DBC HIGH and DBC* LOW in a manner similar to that already described.

The connections from stage 4 to the next stage depend upon whether the next stage must wait for a system response before it assumes its active state. If it is desired that the stepping action be automatic after a predetermined time delay, the next stage will be of the type shown for stages 1, 2, and 3, and conductors DBC and DBC* will supply its controlling potentials. On the other hand, if the next stage must wait for a system response before it becomes active, it will be of the type shown for stage 4. In this case, only one of its control potentials will be supplied by conductor DBC. Its other input will come from a system logic circuit over a conductor analogous to conductor RBC for element 4.

Each position of the sequence circuit of 4D that becomes active holds its output conductors enabled as the succeeding stages become active. All output conductors, once they are enabled, remain enabled until the entire sequence circuit is reset when an enable potential is removed from one of the inputs of the AND gate corresponding to AND gate A1 for element 3 provided that any external input signal to the position and all prior positions remains applied. The removal of an external signal turns OFF the controlling AND gate for the stage to which it is connected as well as to all subsequent stages.

Figure 5A:
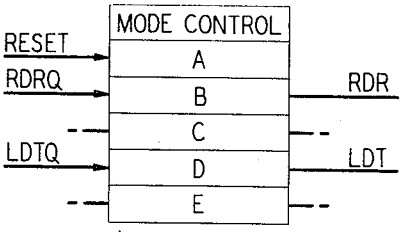
FIG. 5A and 5B disclose additional details of the mode control shown on FIG. 2E.
Figure 5B:
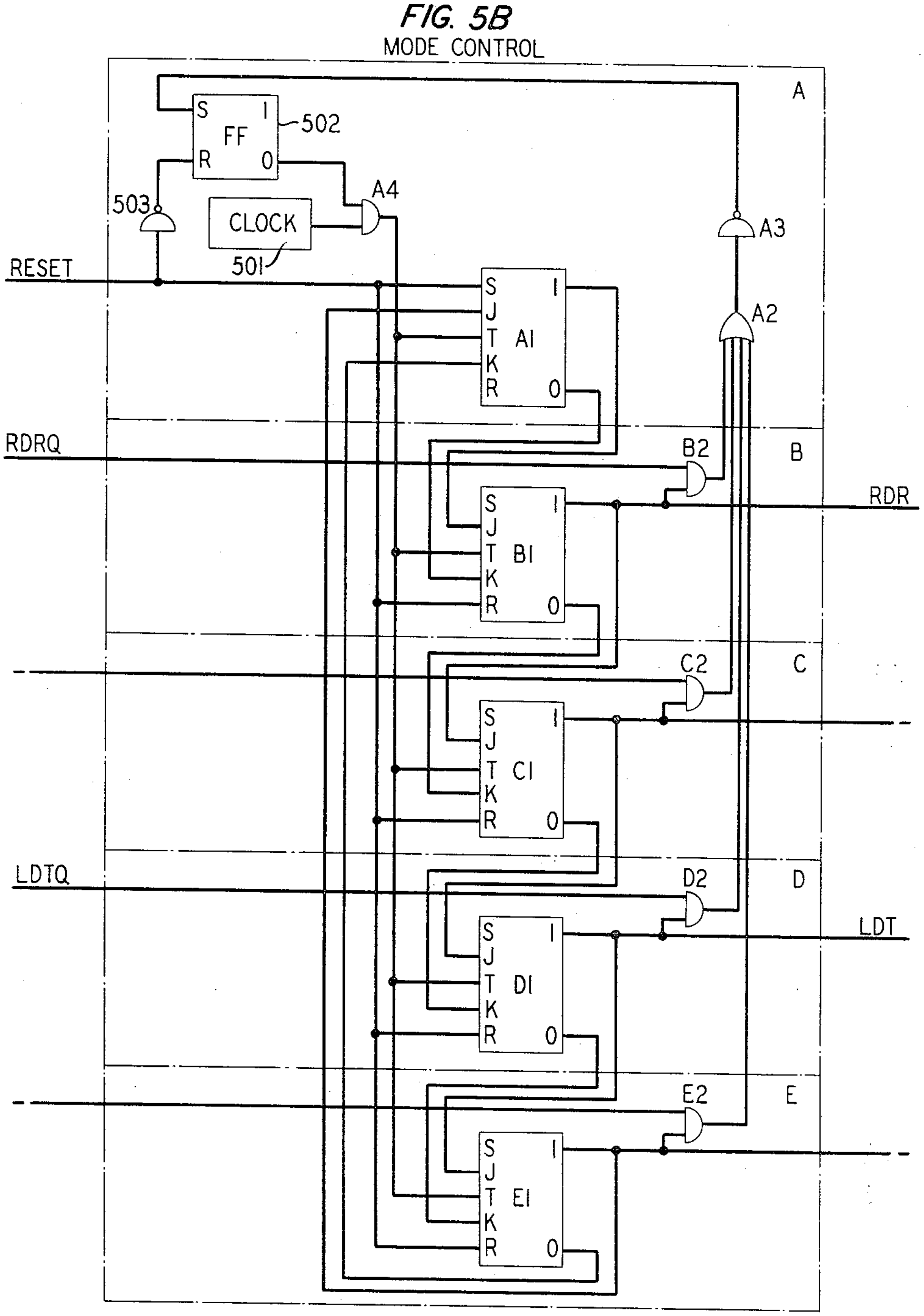

Mode Control - FIG. 5A And 5B

Figure 2G:
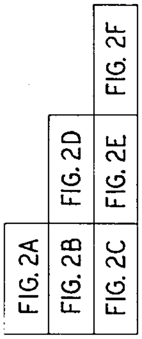
FIG. 2A, 2B, 2C, 2D, 2E, and 2F, when arranged as shown on FIG. 2G, disclose additional details of our invention.
Figure 2A:
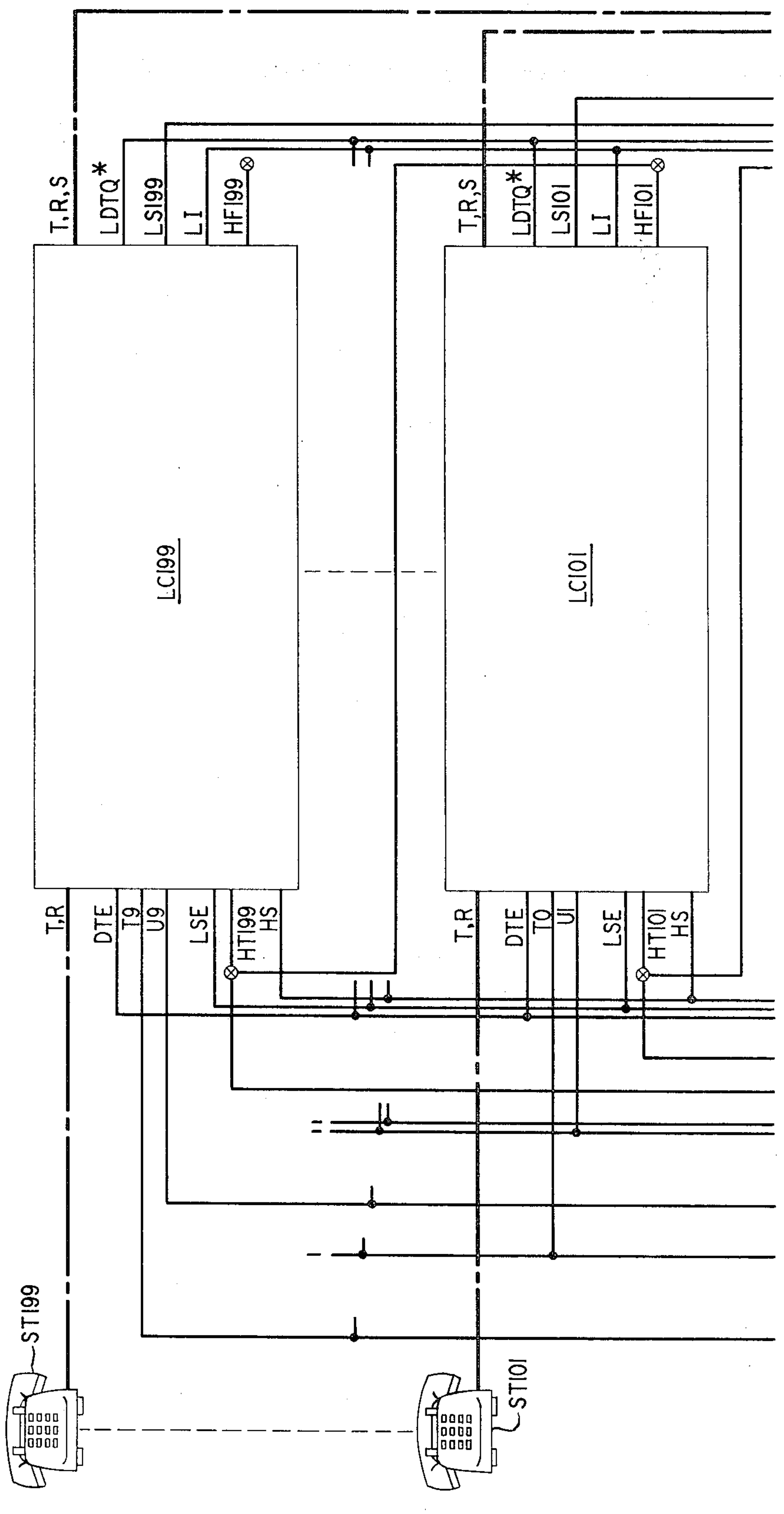
Figure 2B:
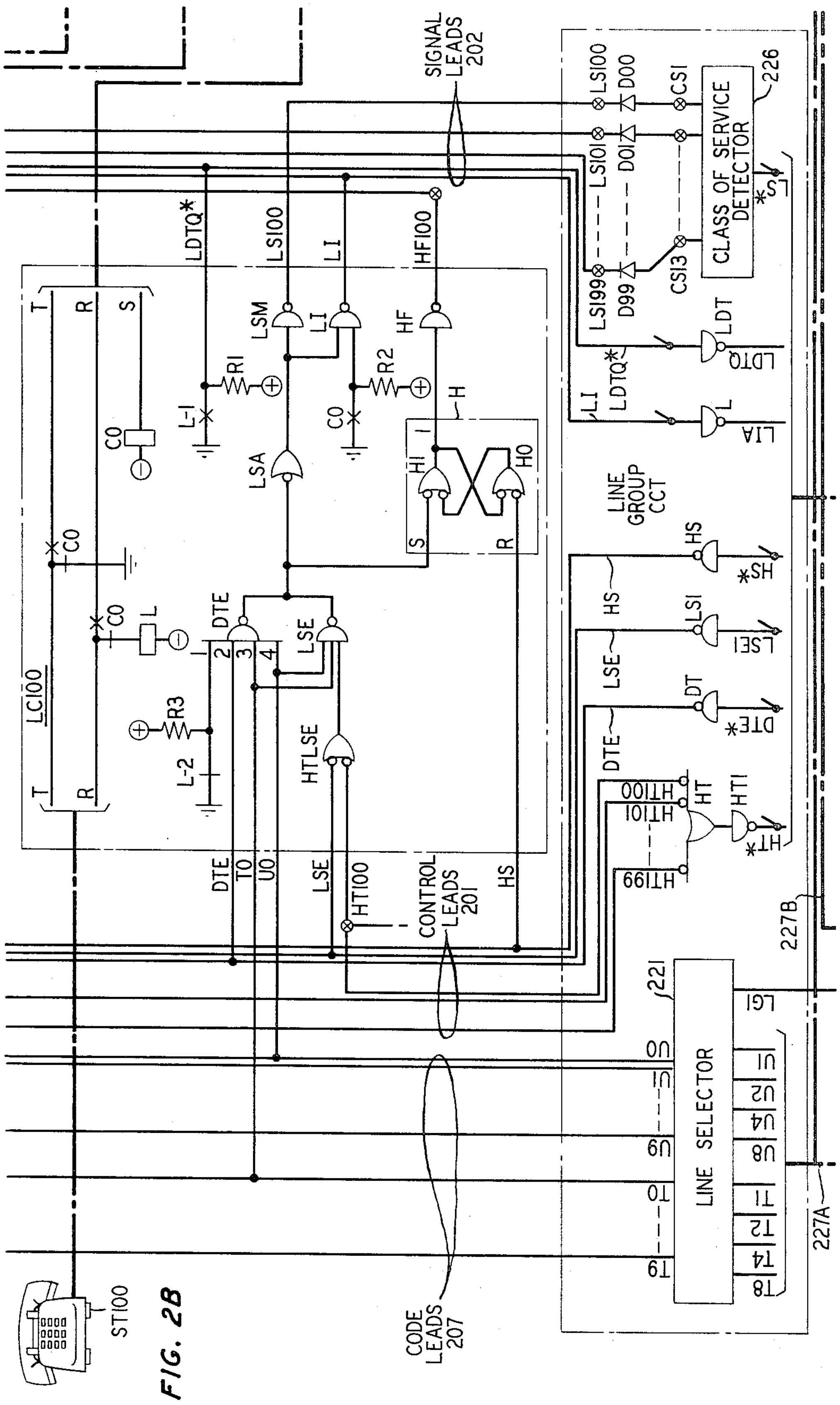
Figure 2C:
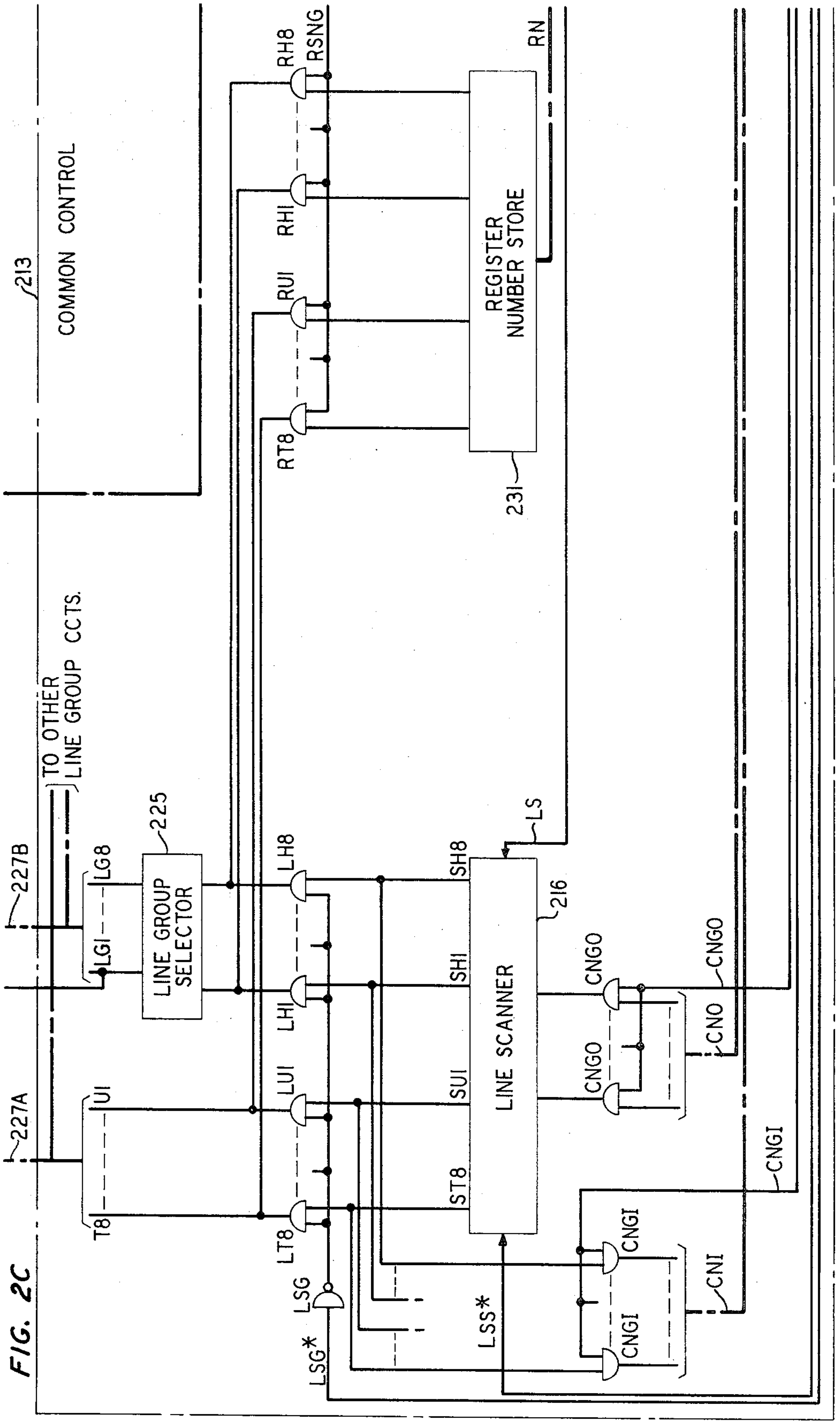
Figure 2D:
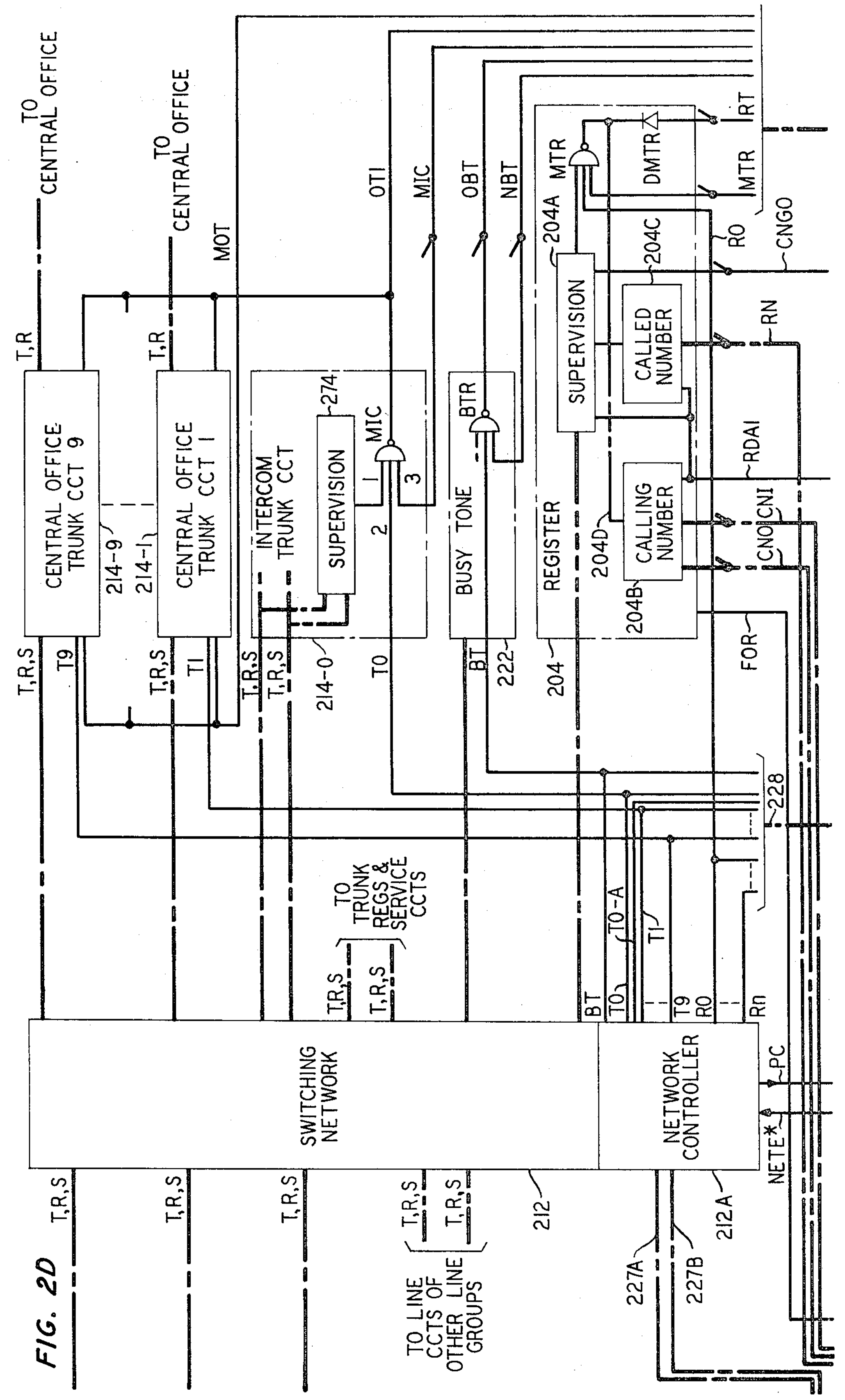
Figure 2E:
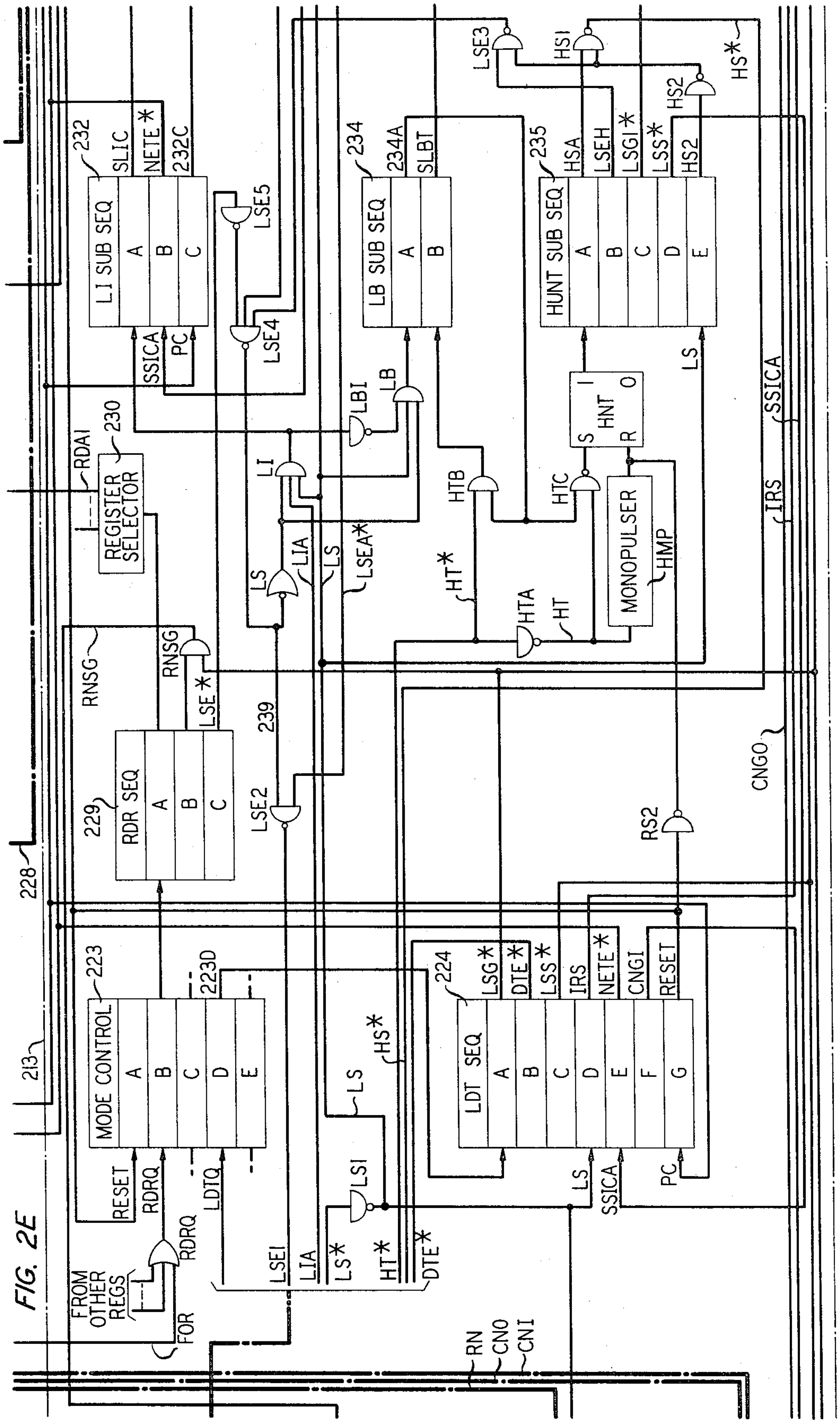

The mode control circuit, which is shown as element 223 on FIG. 2E, is shown in further detail on FIG. 5A and 5B. FIG. 2E and 5A show the mode control as having five sections designated A through E. Input conductors enter the left side of each section; output conductors extend from the right side, sections B, C, D, and E. The mode control of FIG. 5B is also subdivided into operational elements A through E; it further has input and output conductors that correspond to those of FIG. 5A.

The mode control circuit of FIG. 5B uses JK flip-flops in a ring counter configuration. The clock 501 is connected via gate A4 to the T input of each flip-flop. At certain times, as subsequently described, the clock output pulses are effective to advance the operational state of the counter from stage-to-stage one step at a time.

Each JK flip-flop has inputs designated S, J, T, K and R; each JK flip-flop also has outputs designated 1 and 0. A HIGH on the R input resets a flip-flop. This causes its 0 output to be HIGH and its 1 output to be LOW. Conversely, a HIGH on the S input sets a flip-flop so that its 1 output is HIGH and its 0 output is LOW. The J input is functionally associated with the S input and the K input is associated with the R input. The J and K inputs differ from the S and R inputs in that a high input signal to either the J or K input is not effective to alter the state of the flip-flop unless the signal is received coincidentally with a clock pulse on the T input.

The J and K inputs of each flip-flop are connected to the 1 and 0 outputs, respectively, of the previous stage. Depending upon the conductive state of each flip-flop, one of its outputs is HIGH while the other is LOW. When a clock pulse is received on the T input of a flip-flop, it is set to the state of the previous stage under control of the signals applied to its J and K inputs. If the J input is HIGH, the flip-flop is set; if the K input is HIGH, the flip-flop is reset. JK flip-flops are well known in the art and, therefore, no further description of their operation is necessary.

The initial or rest condition of the mode control circuit of FIG. 5B occurs when a reset pulse is applied to the RESET conductor and, in turn, to the S input of flip-flop A1. The RESET conductor also extends to the input of gate 503 as well as to the R input of flip-flops B1, C1, D1, and E1. The reset signal is a HIGH and its application to the RESET conductor sets flip-flop A1 and resets any of flip-flops B1, C1, D1, or E1 that may have previously been in a set state. By means of gate 503, the reset signal also resets flip-flop 502. Subsequently, after the reset signal terminates, the clock pulses pass through gate A4 and advance the JK flip-flop counter chain step-by-step in response to the reception of each clock pulse. Thus, following the setting of flip-flop A1, the next clock pulse sets flip-flop B1 and resets flip-flip A1. The counter chain advances in this manner one step for each clock pulse received until a mode control request signal is received.

When a request is received for a particular mode such as, for example, mode B, the request signal on conductor RDRQ enables or primes the upper input of gate B2. Subsequently, when the counter advances to its position in which the B1 flip-flop is set, the 1 output of the flip-flop enables the lower input of gate B2. This turns the gate on and makes its output HIGH. This HIGH extends to an input of gate A2 which makes its output HIGH. This HIGH is inverted by gate A3 to a LOW. This LOW is extended to the set input of flip-flop 502 to switch it to a set state. The LOW on the 0 output of flip-flop 502 inhibits the upper input of gate A4 so that the clock pulses no longer pass through the gate to the JK flip-flops.

Flip-flop B1 remains set and its 1 output applies a HIGH to the RDR output conductor of element B. The mode control circuit remains in this state until a HIGH is subsequently received on the RESET conductor from one of the sequence circuits shown on FIG. 2. At this time, the reset signal sets the A1 flip-flop, resets flip-flop B1, and resets flip-flop 502. When the reset pulse terminates, the clock pulses are again applied to the JK flip-flops as described so that the circuit advances one step for each pulse until a subsequent service request signal is received.

Because of the order in which the ring counter steps through its sequence, the stages have a preference. In the case of simultaneous mode requests, the highest preference mode is selected. After the mode control is again reset, the highest preference remaining mode request is served so that eventually all waiting mode requests are served.

Detailed Description - FIG. 2A Through 2F

FIG. 2A through 2F, when arranged as shown on FIG. 2G, disclose additional details of our invention beyond that already disclosed on FIG. 1A through 1D. The system of FIG. 2 is similar in most respects to that of FIG. 1. Each element of FIG. 2 corresponding directly to an element on FIG. 1 is designated in a manner that facilitates an appreciation of the correspondence. Thus, network 112 on FIG. 1C corresponds to network 212 on FIG. 2D; code leads 107 on FIG. 1 correspond to code leads 207 on FIG. 2. The highest numbered element on FIG. 1 is trunk scanner 120. Therefore, elements designated 220 or lower on FIG. 2 directly correspond to elements on FIG. 1; elements designated 221 and higher on FIG. 2 do not correspond directly to an element on FIG. 1 due to the inclusion of greater detail on FIG. 2.

The system of FIG. 1 contains 100 lines. The system of FIG. 2 is somewhat more complex in that it discloses a system having a plurality of groups of lines with each group containing 100 lines. The stations or lines of the first group are designated 100 through 199 and are shown in detail. Those of the remaining groups are shown only diagrammatically and are designated 200 through 299, . . . , 800 through 899, . . . Line circuit LC100 for line 100 is shown in detail; it is connected to station ST100 on its left side, and is connected on its right side to an appearance on network 212. In an analogous manner, every other line of the system includes a line circuit LC— that is connected on its left side to a station subset and connected on its right side to the switching network.

In the system of FIG. 1, the code leads 107 extend directly from the line scanner 116 to each line circuit. In the system of FIG. 2, each group of 100 lines has its own set of code leads which extend from the output of a line selector 221 to each line circuit of the group. Each group has its own line selector connected in the manner shown in detail for lines 100 through 199. Line scanner 216 of FIG. 2C corresponds to line scanner 116. However, line scanner 216 communicates only indirectly, rather than directly, with the line circuits via the code leads. It directly controls the operation of the line selector of each line group. Each line selector responds to the signals from the scanner and applies scanning signals from its output to the U- and T- code conductors of its line group and, in turn, to the line circuits of its group.

In a manner similar to that shown for FIG. 1, common control 213 on FIG. 2 communicates with the line circuits by means of control leads 201 and signal leads 202 which correspond to leads 101 and 102 on FIG. 1. The connections between common control and the leads 201 and 202 are shown in greater detail on FIG. 2 than they are on FIG. 1.

The system of FIG. 2 contains a plurality of registers of which only register 204 is shown in detail. It further contains a plurality of trunk circuits. These include an intercom truck circuit 214–0 and a plurality of central office trunk circuits 214–1 through 214–9. It also includes a busy tone circuit 222. The remainder of the trunk and register circuits that comprise the system are shown only diagrammatically by the tip, ring, and sleeve (T, R, S) connections extending from the right side of the switching network 212.

The common control 213 is shown in considerably greater detail on FIG. 2 than it is on FIG. 1. Some of this additional detail includes the gates and logic circuits by means of which elements of common control exchange information with other common control elements as well as with the rest of the system. The remainder of this additional detail comprises a plurality of sequence circuits which are used to provide the control potentials required by the system. The gates and the sequence circuits used in the common control are shown only diagrammatically on FIG. 2. However, these elements are shown in complete detail on FIG. 3, 4, and 5.

Call From Station 100 to Station 101 - Hunting Not Permitted

The following paragraphs describe the operation of the system of FIG. 2 with reference to an assumed call initiated at station 100 (ST100) and directed to station 101. The CO cutoff relay of line circuit 100 (LC100) is released during the idle state of the circuit. At such times, the L relay is bridged directly across the tip and ring conductors between battery and ground via the break contacts of the CO relay. Subsequently, when station 100 goes off-hook, the L relay operates and closes its make contacts L-1 which apply a ground or LOW to conductor LDTQ*. This conductor extends to the input of the LDT gate on FIG. 2B. This gate inverts the LOW and applies a HIGH to conductor LDTZ which extends from FIG. 2B to element D of the mode control circuit 223. The receipt of this signal steps the circuit to its position D which, in turn, applies an output signal over conductor 223D to the input of element A of the LDT sequence circuit 224. This signal steps circuit 224 to its position A which applies a LOW to its output conductor LSG*. The LSG* signal extends from FIG. 2E to FIG. 2C where it is inverted by gate LSG and applied as a HIGH to the left input of each of the AND gates LU1 through LT8 and LH1 through LH8. This HIGH partially primes these gates so that they may subsequently gate the binary output signals from the scanner to line selector 221 and line group selector 225.

Subsequently, after a predetermined time delay, sequence circuit 224 steps from position A to its position B and applies a LOW to conductor DTE*. This LOW extends from FIG. 2E to FIG. 2B where it is applied to the input of gate DT. This gate inverts the LOW and applies a HIGH to conductor DTE which extends to input 2 of the DTE AND gate of each line circuit. Input 1 of this gate in line circuit 100 is currently at a HIGH potential from resistor R3 since the break contacts L-2 of its operated L relay are currently open. Inputs 3 and 4 of the gate are currently LOW. They are driven HIGH when the line circuit is scanned as subsequently described in detail. For the time being, the LOW on inputs 3 and 4 hold the gate in its OFF state in which its output is HIGH.

Sequence circuit 224 next steps from its position B to its position C and applies a LOW to conductor LLS*. The LOW on this conductor extends from FIG. 2E back to FIG. 2C where it is applied to the input of the line scanner to cause it to begin a line scanning operation.

The scanner is essentially a binary counter having a units, tens, and hundreds stage. The output conductor of each counter position is normally LOW but is driven HIGH when the scanner steps to a position associated with a particular conductor. The scanner is arranged to count in binary from 100 through 899 with each of its positions being unique to the correspondingly designated line circuit. The signals from its units and tens positions extend over conductors SU- and ST- to gates LU- and LT- and from there to the input of the line selector for each group of 100 lines. The line selector for each group converts the scanner binary output information to decimal and applies it to the code leads of its group. The binary output signals from the hundredths stage of the counter extend through the LH- gates to the line group selector 225 which energizes one of its output conductors LG1 through LG8, depending upon the current operative position of the counter. Output conductor LG1 of the line group selector extends to line selector 221 for the first group of 100 lines. The remaining output conductors of line group selector 225 each extend to the line selector for a different one of the remaining groups of 100 lines. Although all line selectors receive the units and tens binary information generated by the scanner, a line selector can respond to these signals only if it also receives an output signal from the line group selector. Thus, line selector 221 for lines 100 through 199 is energized or primed by a signal on output conductor LG1 from the line group selector. At that time, only this line selector may respond to the tens and units signals generated by the line scanner.

When the line scanner steps to its hundreths position in which it energizes its output conductor SH1, this signal passes through AND gate LH1 since the left-hand input of all scanner output AND gates are currently HIGH from the output of gate LSG. The signal on conductor LH1 causes the line group selector to apply a signal to conductor LG1 to activate line selector 221. During the time the signal on conductor LG1 persists, the tens and units signals generated by the scanner are transmitted through the LT- and LU- AND gates to the line selector 221. This circuit responds to these signals and applies scanning potentials to code leads 107.

Each code lead is normally LOW but is driven HIGH when the scanner assumes a position associated with the code lead. Thus, when line circuit 100 is scanned, its code leads UO and TO are HIGH and the other code leads are LOW. This causes a HIGH to be applied to inputs 3 and 4 of AND gate DTE of line circuit 100. The other two inputs of the gate are HIGH for reasons already mentioned and, therefore, the gate turns ON at this time and drives its output LOW. This LOW extends to the input of gate LSA to turn it OFF and drive its output HIGH. This, in turn, turns gate LSM ON and drives its output conductor LS00 LOW. This LOW is extended through diode D00 to terminal CS1 of the class of service detector 226. This circuit receives the class of service mark from the line circuit LS— leads, generates appropriate class of service information, and applies a LOW to its output conductor LS* and to one of its output conductors CS-*, such as CS1*. The signal on conductor LS* extends from FIG. 2B to FIG. 2E where it is inverted by gate LSI and steps the sequence circuit 224 to its position D. The HIGH on conductor LS also extends to the right side of the line scanner 216. The receipt of this signal causes the scanner to terminate its scanning operation and to stop in its operative position associated with line 100.

The next step in serving the call is for the system to select and connect an idle register via the switching network to the calling line circuit. The stepping of sequence circuit 224 to its position D applies a signal to conductor IRS which extends on FIG. 2F to the input of the scanner control circuit 220B and to the input of the register bid circuit 218. The receipt of the IRS signal by these circuits initiates the system operations required to select an idle register.

Let it be assumed that register 204 on FIG. 2D is idle and is selected for use on the call. The selection of the register is controlled by its gate MTR. This gate has three input conductors and the register is selected only when its gate is switched from a normally OFF to an ON state. The supervision circuit 204A of the register applies an enable potential to the upper input of its gate whenever the register is idle. The MTR conductor extends from the output of the register bid circuit 218 to the lower input of the MTR gate. The middle input of the gate of register 204 is connected to output conductor RO of scanner 220.

The signal on conductor IRS causes the register bid circuit 218 to apply an enable conductor to output conductor MTR which extends to all register circuits. With reference to the call now being described, this signal enables the lower input of gate MTR of register 204. The receipt of the IRS signal by scanner control 220B activates scanner 220 and causes it to step through its counting positions in which it applies a scanning potential to each one of its output conductors in sequence. When it steps to its position associated with conductor R0, it applies a scan signal to that conductor and, in turn, to the middle input of gate MTR of the register. The other two inputs of the gate are already enabled and, therefore, the enabling of its middle input turns the gate ON and drives its output LOW. This LOW extends over conductor RT to FIG. 2F and, from there, to the right input of gate SSICA. This signal is propagated through the gate and applied as a stop scan signal to scanner 220. This stops the scanner in its operative position associated with conductor R0 and register 204.

Figure 2F:
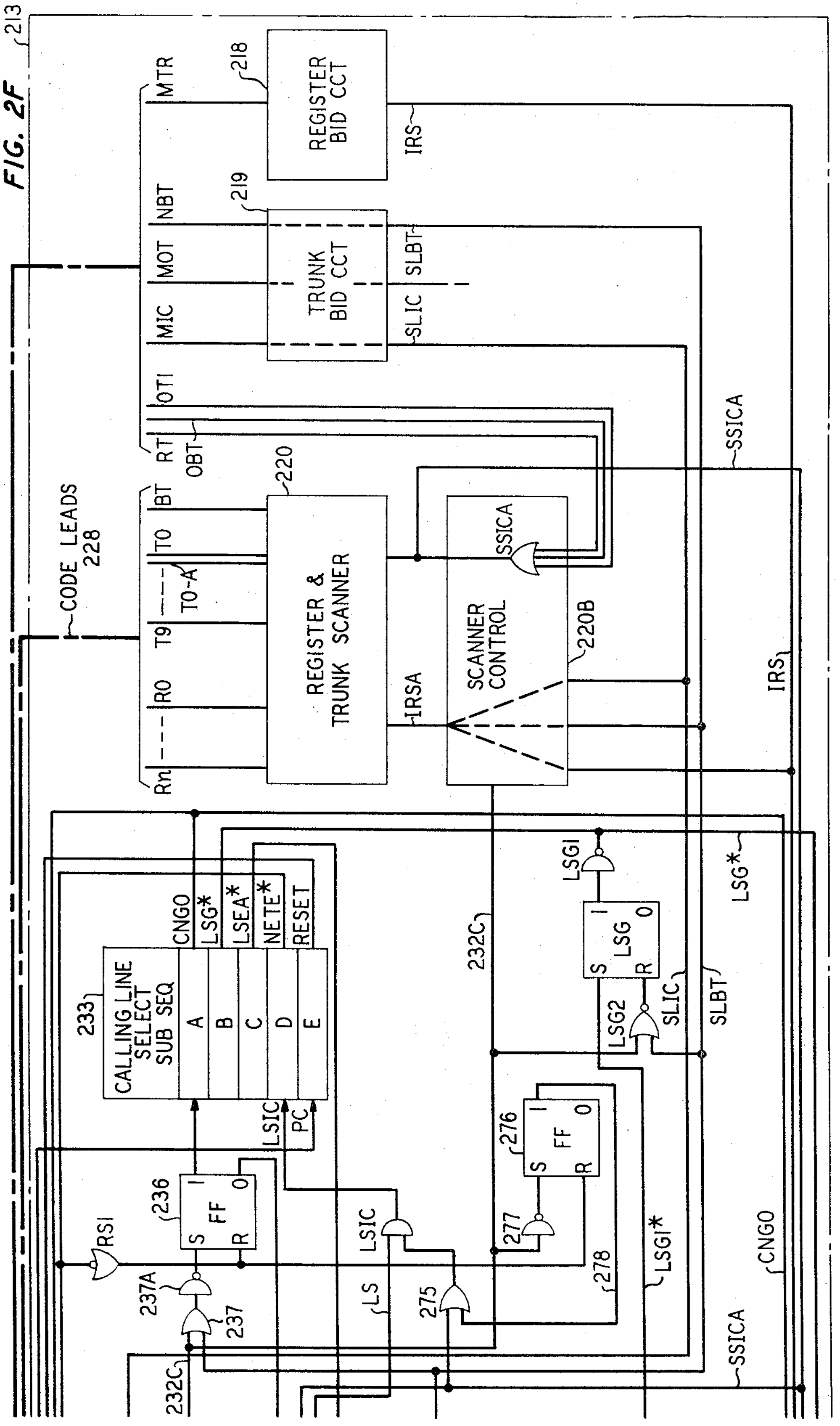

The output signal from gate SSICA is also extended over conductor SSICA from FIG. 2F to the input of section E of sequence circuit 224. This steps the sequence circuit to its position E and applies a LOW to its output conductor NETE*.

Line scanner 216 is still in its operative position 100. Therefore, the signals it is currently applying to its output conductors constitute an identification of calling line 100. Similarly, the signals scanner 220 is currently applying to its output conductors constitute an identification of the selected register, i.e., register 204. The identification information from the line scanner is applied over cables 227A and 227B to the line side input of the network controller 212A; the register identification information from scanner 220 is applied over cable 228 to the trunk side input of the network controller. This identification information from the two scanners, together with the signal on conductor NETE*, causes the network to establish a path between line circuit 100 and register 204.

The sequence circuit 224 advances from its position E to its position F subsequent to the application of the LOW to conductor NETE*. This causes the sequence circuit to apply an enable signal to conductor CNGI which extends to one input of each of the CNGI gates on FIG. 2C. The other input of each of these gates is connected to an individual one of the output conductors of line scanner 216. The potential on conductor CNGI enables the gates associated with position 100 of the scanner and thereby gates the calling number 100 onto cable CNI. This cable extends from FIG. 2C to FIG. 2D where it applies the number 100 into the calling number store 204B of register 204. Element 204B stores the calling number for subsequent use on the call. The output of the MTR gate in register 204 permits only the calling number store of register 204 to receive the information currently gated onto cable CNI.

The network applies a path complete signal to conductor PC when it completes the establishment of a network connection between calling line circuit 100 and register 204. The signal on conductor PC advances the sequence circuit 224 to its position G in which it applies an output signal to the RESET conductor extending to element A of mode control circuit 223. This steps the mode control from position D to position A. The removal of the output signal from mode control element D disables sequence circuit 224 and, in so doing, removes the currently applied signals from all of its output conductors. This effectively releases common control from the present call and permits it to serve other calls.

The calling party at station 100 now dials digits of the called station. Since it has been assumed that the call is to be extended to station 101, the calling party now dials the digits 101. The dialed digits are transmitted through the network to the register and stored in its called number store 204C in the conventional manner. The register applies a readout request signal to conductor FOR after it determines that the digits representing a complete number have been dialed. The signal on conductor FOR is extended through the RDRQ gate on FIG. 2E and applied to element B of mode control 223. This steps the mode control to its position B and, in so doing, applies a signal to the input of element A of the read register sequence circuit 229. The next function to be performed by the system in connection with the serving of the presently described call is for the called line to be identified, selected, and then tested to determine whether it is currently idle or busy. The activation of element A of sequence circuit 229 initiates these system functions.

The activation of element A applies a signal to the register selector 230 which has an operative position and an output conductor unique to each different register in the system. The output conductor unique to register 204 is designated RDA1 and it extends from the output of the register selector to register 204.

The register selector 230 responds to the input signal from sequence circuit 229, steps to its operative position associated with register 204, and applies an enable potential to conductor RDA1. This signal causes the called number store 204C of register 204 to gate the called number digits 101 onto cable RN which extends from FIG. 2D to the register number store 231. The signals received by this element from cable RN are registered for subsequent use in identifying and selecting the called line.

The read register sequence circuit 229 next steps from its position A to its position B and applies a signal over its output conductor to the upper input of AND gate RSNG. Conductor LSG* is currently HIGH because sequence circuit 224 is not active at this time. Therefore, the signal applied to the upper input of gate RSNG is propagated through the gate and applied to conductor RSNG which extends to the RT-, RU-, and RH- AND gates on FIG. 2C. These gates are connected to the output conductors of the register number store. The signal on conductor RSNG partially enables each of these AND gates and, in so doing, gates the called number digits 101 from store 231 to the input of the line group selector 225 and the line selector 221.

Group selector 225 enables its output conductor LG1 which extends to the input of line selector 221. The T- and U- input conductors of selector 221 receive signals representing the digits 01. This causes the line selector to apply a HIGH to code lead conductors T0 and U1. The signals on these conductors have no immediate effect on the DTE gate of line circuit 101 since conductor DTE is not currently enabled. The code lead signals have no effect on gate LSE of line circuit 101 since its lower input is not currently enabled.

The read register sequence circuit 229 subsequently steps to its position C and, in so doing, applies a LOW to its output conductor LSE*. The LOW on this conductor is extended to the input of gate LSE5 which inverts it and applies a HIGH to the upper input of gate LSE4. The middle input of gate LSE4 is HIGH since flip-flop 236 is currently in a reset state in which its 0 output is HIGH. The lower input of the gate is also HIGH since gate LSE3 is currently in an OFF or nonconductive state due to a LOW on its input conductor LSEH from the B element of the hunt sequence circuit 235. This entire sequence circuit is currently inactive.

All inputs of AND gate LSE4 are currently HIGH and, therefore, the gate turns ON and applies a LOW to its output conductor which extends over conductor 239 to the upper input of gate LSE2 and gate LS. This LOW turns gate LSE2 OFF and applies a HIGH to conductor LSE1 which extends to the input of gate LS1 on FIG. 2B. This gate inverts the HIGH and a applies a LOW to conductor LSE which extends to the upper input of the HTLSE gate of each line circuit. This LOW turns each HTLSE gate OFF and drives its output HIGH which extends to the lower input of the LSE gate of each line circuit. Only code leads TO and U1 are energized at this time by line selector 221. These two potentials extend to line circuit 101 where they, together with the LOW on conductor LSE, cause gate LSE to turn ON and drive its output LOW. The LSE gate of no other line circuit turns ON at this time since no other line circuit currently has both of its code leads energized by line selector 221. The LOW on the output of gate LSE in line circuit 101 turns OFF its gate LSA to drive its output HIGH. The HIGH on the output of this gate turns ON gate LSM to drive conductor LS101 LOW. This HIGH is also extended to the upper input of gate LI. The circuit operations resulting from the LOW on conductor LS101 are described subsequently.

The circuit actions resulting from the application of the HIGH to the upper input of gate LI depends upon whether line 101 is currently busy or idle. If the line is busy, its cutoff relay CO is operated and the make contacts of this relay apply a ground to the lower input of gate LI to prevent the gate from turning ON. This holds conductor LI HIGH. On the other hand, if the line is idle, the CO relay is released and the lower input of the gate is HIGH. This permits the LI gate to turn ON and drive conductor LI LOW when gate LSA turns OFF and drives the upper input of the LI gate HIGH. In summary, the gating of the called number 101 onto the code leads, and the resultant turn-ON of gate LSE in called line circuit 101, causes a LOW to be applied to conductor LI if the called line is idle and a HIGH to remain on the conductor if the called line is busy.

The Called Station Is Idle

Let it initially be assumed that the called station is idle. Consequently, both of its gates LI and LSM turn ON and apply a LOW to conductors LS101 and LI. The LOW on conductor LS101 is applied to the class of service detector 226 where it causes that circuit to apply a LOW to its output conductor LS*. The LOW on conductor LW* is inverted by gate LS1 and applied as a HIGH to conductor LS. The LOW on conductor LI is inverted by gate L and applied as a HIGH to conductor LIA. The HIGH on conductors LIA and LS are applied to the lower two inputs of gate LI on FIG. 2E. The upper input of the gate is HIGH at this time by virtue of the LOW on conductor 239 from gate LSE4. This LOW is inverted by gate LS and applied as a HIGH to the upper input of the LI gate. The LI gate, therefore, turns ON at this time and activates element A of the line idle subsequence circuit 232. This causes a HIGH to be applied to conductor SLIC which extends both to the scanner control 220B and to the trunk bid circuit 219. The receipt of this signal by the trunk bid circuit activates its output conductor MIC which extends to input 3 of the MIC gate of each intercom trunk circuit. This partially enables the gate and subsequently permits the first intercom trunk circuit that is scanned to be seized for use on this call.

The receipt of the signal on conductor SLIC by scanner control 220B activates scanner 220 and causes it to apply scanning signals to its output conductors. Let it be assumed that intercom trunk circuit 214—0 is idle and available for use on this call. Input 1 of its gate MIC is enabled at this time by its supervision circuit 274. Input 2 of the gate is enabled when the scanner applies an enable potential to code lead conductor TO. This turns ON the MIC gate and drives its 0T1 output conductor LOW which extends back to the scanner control circuit 220B on FIG. 2F. This signal is propagated through the SSICA gate and applied as a stop scan signal to scanner 220. This stops the scanner in its operative position associated with its output conductor TO and intercom trunk circuit 214–0.

At this stage of the call, the called number 101 is currently being gated from the register number store 231 to the line selector 221 and, in turn, to the code leads 207; the output of scanner 220 is currently applied to conductor TO extending to trunk circuit 214–0. These two items of information respectively identify the called line circuit 101 and intercom trunk circuit 214–0. The called number 101 is supplied at this time over cables 227A and 227B to the line side of the network controller; the intercom trunk circuit identification is supplied to the trunk side of the network controller by conductor TO.

The line idle subsequence circuit 232 now steps to its position B and applies a LOW to conductor NETE*. This LOW extends to the network controller where it causes the network to establish a connection between line circuit 101 and the upper network appearance of intercom trunk circuit 214–0. The controller applies an enable signal to conductor PC when this path is established. This signal steps sequence circuit 232 to its position C in which it applies a potential to its output conductor 232C. This potential is extended through gate 237 to set flip-flop 236. This potential is further extended to the input of scanner control 220B.

The receipt of this potential by scanner control causes the scanner 220 to advance one step, namely, from its position TO to its position TO-A. This transfers the scanner output potential from conductor TO to conductor TO-A which extends to network controller 212A. As is described in subsequent paragraphs, the purpose of transferring the scanner output conductor to potential TO-A is to apply the necessary control information to the network so that when the calling line is subsequently selected, the network will establish a path between the calling line and the second (the lower) appearance of the intercom trunk circuit 214–0. The called line has already been connected to the upper network appearance by virtue of the scanner output potential applied to conductor TO. The calling line is connected to the lower appearance by the signal on conductor TO-A. The signal on conductor 232C is inverted by gate 277 and applied as a LOW to switch flip-flop 276 to a set state. The resultant HIGH on the 1 output of this flip-flop is extended through gate 275 to the lower input of gate LSIC. This signal holds the lower input of gate LSIC HIGH when the SSICA signal terminates as the scanner is advanced from its position TO to its position TO-A.

With flip-flop 236 in a set state, its 1 output applies an enable potential to the input of position A of the calling line select subsequence circuit 233 to activate it. The 0 output of the flip-flop applies a LOW to turn OFF gate LSE4 and drive its output HIGH. The output of the LSE4 gate going HIGH propagates through gates LS and LI making the output of the LI gate LOW disabling sequence circuit 232 and returning its outputs to their idle state. The activation of position A of sequence circuit 233 applies a potential to its conductor CNGO which extends from FIG. 2F to the righthand input of each of the CNGO AND gates of FIG. 2C. This conductor also extends to the supervision circuit 204A of all registers, such as register 204. The receipt of the CNGO signal by register 204 causes its supervision circuit 204A to release the circuitry that is currently holding up the network connection from the register to calling line circuit 100. The signal on conductor RDA1 controls supervision circuit 204A so that only register 204 responds to the CNGO signal and releases its network holding circuitry.

The outputs of gates CNGO extend to the lower input of line scanner 216. The register selector 230 is currently applying an enable potential to conductor RDA1 which extends to register 204. This potential causes the register to gate the calling number information over its output conductors of cable CNO to the left-hand input of the CNGO gates on FIG. 2C. The enable potential now on conductor CNGO gates the calling number information from cable CNO into the line scanner and forces it to its operative position associated with calling line 100. The calling number is applied by the scanner to its output conductors which extend to gates LH-, LT-, and LU-.

Next, sequence circuit 233 steps from its position A to position B and applies a LOW to conductor LSG*. This LOW is applied to the lower input of AND gate RSNG on FIG. 2E to disable it. This removes the output signal from conductor RSNG which extends to the RH-, RT- and RU- output gates of the register number store 231 on FIG. 2C. This disables these gates and removes the called number information from the input of line selector 221. The LOW on the LSG* lead is inverted by the LSG gate on FIG. 2C and applies as a HIGH to the output gates of the line scanner 216 to enable them. This permits the line scanner to pass the calling number information to the line selector 221 and line group selector 225. Selector 221, in turn, applies potentials to the code leads TO and UO to identify line circuit 100.

Next, sequence circuit 233 steps to its position C and applies a LOW to conductor LSEA* and, in turn, to the lower input of gate LSE2. The upper input of gate LSE2 is currently HIGH from the output of gate LSE4 since flip-flop 236 is in a set state. Gate LSE2 inverts the LOW on conductor LSEA* and applies a HIGH to conductor LSE1 which extends to the input of gate LS1 on FIG. 2B. Gate LS1 inverts the HIGH and applies a LOW to conductor LSE which extends to an input of the HTLSE gate of each line circuit. Each HTLSE gate inverts the LOW and applies a HIGH to the lower input of the LSE gate of its line circuit. Only the LSE gate of calling line circuit 100 can respond since only its code lead conductors UO and TO are enabled at this time. The turn-ON of this gate in line circuit 100 turns OFF gate LSA, and turns ON gates LSM and LI. Gate LI turns ON since relay CO released when the register released the network path to calling line circuit 100. The turn-ON of gate LSM applies a LOW to its output conductor LS100. The LOW on conductor LS100 is extended to the class of service detector 226 which applies a low to its LS* output conductor. The LOW on the LS* conductor is inverted by gate LS1 making its output conductor LS high.

The HIGH on conductor LS extends to the upper input of gate LSIC on FIG. 2F. The lower input of the gate is currently HIGH from gate 275. Gate LSIC now turns ON and applies a HIGH to conductor LSIC which extends to position D of the calling line select subsequence circuit to cause that circuit to advance to its position D. This, in turn, applies a LOW to conductor NETE* which extends to the input of the network controller 212A. The signals applied from cables 227A and 227B to the line side of the network controller at this time identify the calling line circuit; the signals applied to the truck side, namely, the signal on conductor TO-A, identify the selected trunk circuit. The signal on conductor NETE* causes the network to establish a connection between calling line circuit 100 and the second appearance of the intercom trunk circuit 214.

The network controller returns a signal on conductor PC when this path is established. This signal advances sequence circuit 233 to its position E and causes it to apply a signal to the RESET conductor which extends from FIG. 2F to position A of the mode control 233. This resets the mode control 223 to its position A and removes the output signal from its position B. The removal of this signal, in turn, disables sequence circuits 229, and 233. This restores common control to its normal state in which it is free to serve other calls.

The completion of the network connection between calling line circuit 100 and intercom trunk circuit 214–0 completes the establishment of a call connection between calling line 100 and called line 101 via intercom trunk circuit 214–0.

The Called Station Is Busy

It was assumed in connection with the call connection described in the preceding paragraphs that the station 101 was idle and, therefore, free to receive the call initiated by station 100. Let it now be assumed that station 101 is busy. This condition is detected when the called number 101 is gated out of the register number store 231, through the line selector 221 and line group selector 225, and applied to code leads TO and U1.

The turn-ON of gate LSE of line circuit 101 at this time turns OFF gate LSA, turns ON gate LSM, and applies a HIGH to the upper input of gate LI. Since the called line is busy, its CO cutoff relay is operated and applies a ground to the lower input of its LI gate. This ground prevents the gate from turning ON. Therefore, conductor LI remains HIGH.

The turn-ON of gate LSM of line circuit 101 applies a LOW to conductor LS101 extending to the class of service detector 226. This causes a LOW to appear on output conductor LS* of this circuit. This LOW is extended to FIG. 2E inverted by gate LS1 as a HIGH on conductor LS, where it is applied to the lower input of the LI gate and to the middle input of the LB gate. The HIGH on conductor LI is inverted by gate L (FIG. 2B) and applied via conductor LIA as a LOW to the middle input of gate LI. This inhibits the gate, holds its output LOW, and holds the output of inverting gate LB1 HIGH. This HIGH is connected to the upper input of the LB gate. The lower input of the LB gate is HIGH at this time by virtue of the ground on conductor LSE* from position C of the read register sequence circuit 229. This ground is propagated through gates LSE5, LSE4, and LS and appears as a HIGH on the lower input of gate LB.

All three inputs of gate LB are now HIGH. This drives its output HIGH which extends to position A of the line busy sequence circuit 234. Position A is activated in response to the receipt of this signal and, in turn, it applies a HIGH to its output conductor 234A. This HIGH extends to the lower input of gate HTB and the upper input of gate HTC. Let it be assumed that hunting is not permitted on this call. (Ignore the strap from terminal HF101 to terminal HT199 on FIG. 2A.) This being the case, conductor HT* is currently HIGH. This HIGH is applied to the upper input of gate HTB. The lower input of the gate is already HIGH from conductor 234A. Therefore, the gate turns ON and applies a signal to step sequence circuit 234 to its position B. This applies a signal to conductor SLBT which extends to the lower input of gate 237, to the input of the scanner control 220B, as well as to the input of the trunk bid circuit 219. The trunk bid circuit activates its output conductor NBT which extends to the busy tone circuit 222 to prime its selection gate BTR so that it may be enabled on a subsequent scanning operation. The SLBT signal to scanner control causes that circuit to activate scanner 220. This circuit now begins a scanning operation to select a busy tone circuit to which the calling line may be connected. The scanner steps to its position BT and activates output conductor BT which extends a scan signal to busy tone circuit 222, as well as to the trunk side of the network controller. A stop scan signal is returned over conductor OBT to the input of gate SSICA within scanner control when busy tone circuit 222 is scanned. This signal stops the scanner in its position BT so that it maintains an enable or scan potential on scan conductor BT.

The application of the SLBT signal to gate 237 sets flip-flop 236. The "1" output of the flip-flop now enables element A of the sequence circuit 223 which as already described, gates out the calling line number to the code leads and causes the switching network to establish a path from the calling line circuit to the selected busy tone circuit. The network returns a signal on conductor PC when this path is established. This signal steps sequence circuit 233 to its position E which applies a signal to the RESET conductor to restore the mode control and common control to its idle state.

Call to Station 100 - Hunting Permitted

The immediate preceding paragraphs describe the operation of the system for the condition in which the called line was determined to be busy but not equipped for hunting. Let it now be assumed that hunting is permitted. Let is also be assumed (1) that a station in a different line group attempts to call station 100, (2) that station 100 is busy, and (3) that the system is arranged to hunt to station 101 in an attempt to direct a call to it whenever station 100 is busy. On FIG. 2B, terminal HF100 of line circuit 100 is connected by a strap to terminal HT101 of line circuit 101 on FIG. 2A. This connection, together with the facilities in common control, cause the system to attempt to route calls to station 101 whenever station 100 is busy upon the receipt of a call directed to it.

Since called line 100 is assumed to be busy at this time, when the system attempts to extend a call to it, its LSE gate turns ON, its LSA gate turns OFF, turns ON its gate LSM, and attempts to turn ON its gate LI. However, the make contacts of the operated CO relay of line circuit 100 (since it is busy) apply a ground to the lower input of its LI gate to prevent it from turning ON. Therefore, conductor LS100 now goes LOW and conductor LI remains HIGH. The turn-ON of gate LSE also applies a LOW to the upper input of gate H1 of the H flip-flop. This turns OFF gate H1, drives its 1 output HIGH which, in turn, turns ON gate HF to drive conductor HF100 LOW. The HIGH on the output of gate H1 is also extended to the upper input of gate HO in the flip-flop.

The LOW on terminal HF100 is extended by means of the indicated strap to terminal HT101 of line circuit 101. This connection causes the system to attempt to route the call to line circuit 101. The LOW on terminal HT101 is extended over conductor HT101 to the input of the HT OR gate (FIG. 2B). This LOW is inverted by the gate, applied to the input of gate HT1 which inverts the HIGH on its input and applies a LOW to conductor HT*. This LOW extends from FIG. 2B. to FIG. 2E where it is applied to inputs of gate HTA and HTB. Gate HTA inverts the LOW and applies a HIGH to the lower input of gate HTC.

In a manner similar to that already described, the busy state of line circuit 100, the resultant HIGH on conductor LI, the LOW on conductor LS100, and the HIGH on conductor LS, together cause the system to turn ON gate LB (FIG. 2E) whose output, in turn, activates state A of the line busy sequence circuit 234. The output of this stage applies a HIGH to conductor 234A which extends to the lower input of gate HTB and the upper input of gate HTC. The LOW applied by the HT* conductor to the upper input of gate HTB inhibits it. The HIGH applied by conductor HT to the lower input of gate HTC, together with the HIGH on the upper input of the gate from position A of sequence circuit 234, turns the gate ON to set flip-flop HNT. The setting of this flip-flop activates position A of hunt sequence circuit 235. Element A applies a HIGH over conductor HSA to the upper input of AND gate HS1. The lower input of the gate is enabled at this time by gate HS2 and, therefore, gate HS1 now turns ON and applies a LOW to conductor HA*. This LOW extends to the input of gate HS on FIG. 2B. This gate inverts the LOW and applies a HIGH over conductor HS to all line circuits of this group. In line circuit 100, this HIGH is extended to the lower input of gate HO to hold it ON and lock the flip-flop in a set state since the upper input of the HO gate is currently HIGH from the output of gate H1. The output of gate HO holds gate H1 OFF. The corresponding HO gate in every other line circuit does not turn ON since the LSE gate in every other line circuit is currently in an OFF state. This holds the upper input of every other HO gate HIGH. As subsequently described, the set state of the H flip-flop in line circuit 100 maintains the HIGH to the input of gate HF to hold terminal HF100 LOW while the system hunts and attempts to extend the call to line circuit 101.

At this time, the LOW on terminal HF100 is extended to terminal HT101 of line circuit 101 as already mentioned. This LOW extends to the lower input of the HTLSE gate of that line circuit to turn that gate OFF and drive its output HIGH. This HIGH extends to the lower input of its LSE gate and partially enables the gate so that it may subsequently turn ON when the system hunts to line circuit 101.

Hunt sequence circuit 235 next advances to its position B and applies a HIGH over conductor LSEH to the upper input of gate LSE3. The lower input of this gate is currently HIGH from the output of gate HS2. Gate LSE3 now turns ON and applies a LOW to the lower input of gate LSE4. This turns gate LSE4 OFF which applies a HIGH to the upper input of gate LSE2. Gate LSE2 inverts the HIGH and applies a LOW to conductor LSE1 which extends to the input of the LS1 gate on FIG. 2B. This LOW is inverted by the gate and applied as a HIGH to conductor LSE which extends to the upper input of the HTLSE gate of each line circuit. This HIGH turns ON this gate in every line circuit other than line circuit 101. The HTLSE gate of line circuit 101 is held OFF at this time by the ground applied to its lower input from terminal HT101. The turn-ON of the HTLSE gate of every line circuit other than 101 generates a LOW on its output which effectively disables the LSE AND gate of every such other line circuit so that gate LSE of only line circuit 101 can subsequently respond to the code lead potentials when the system hunts to line circuit 101.

Next, the hunt sequence circuit 235 steps to its position C and applies a LOW to conductor LSG1*. This LOW is extended to the S input of flip-flop LSG on FIG. 2F. The LSG1* signal switches the flip-flop to a set state in which its 1 output is HIGH. Gate LSG1 inverts this HIGH and applies a LOW to conductor LSG* which extends to gate LSG on FIG. 2C. Gate LSG inverts the LOW and applies a HIGH to the left-hand inputs of the line scanner output gates. This HIGH enables these gates so that they can pass the scanner output potentials to line group selector 225 and line selector 221.

Sequence circuit 235 next steps to its position D and applies a LOW to conductor LSS* which extends to input LSS* of the line scanner. This starts the line scanner and causes it to scan the line circuits by applying signals to code leads 207.

Gate LSE of line circuit 101 turns ON when that line circuit is scanned and enable potentials are applied by line selector 221 to code leads TO and U1. The turn-ON of gate LSE turns OFF its LSA gate which turns ON its LSM gate and attempts to turn ON its LI gate by applying a HIGH to its upper input. If line 101 is idle, its CO relay is released, and the HIGH on the lower input of its LI gate turns the gate ON and drives the LI conductor LOW. If the line is busy, its CO relay is operated, and the ground on the lower input of its LI gate prevents the gate from turning ON and, in so doing, holds its LI output conductor HIGH.

Call Completed to Idle Hunted Line 101

Let it initially be assumed that station 101 is idle. In this case, both output conductors LS101 and LI go LOW as gates LSM and LI turn ON. The LOW on conductor LI is inverted by gate L (FIG. 2B) and applied as a HIGH to conductor LIA which extends to the middle input of gate LI on FIG. 2E. The LOW on conductor LS101 is applied to the class of service detector 226 which applies a LOW to its output conductor LS*. This LOW is inverted by gate LS1 to a HIGH on lead LS which extends to inputs of gates LI and LB on FIG. 2E as well as to the input of element E of sequence circuit 235. This steps the sequence circuit to its position E and applies a HIGH to the input of gate HS2. This HIGH is inverted by the gate and applied as a LOW to gates HS1 and LSE3. The turn-OFF of gate HS1 applies a HIGH to conductor HS*. This HIGH is inverted by gate HS on FIG. 2B and applied as a LOW over conductor HS to all line circuits. This LOW turns OFF the HO gate and resets the flip-flop of line circuit 100 since its LSE gate turned OFF when the scanner stepped out of position 100. The turn-OFF of gate HO turns ON its gate H1 which applies a LOW to the input of gate HF. Gate HF inverts the LOW and applies a HIGH to its output terminal HF100 which, in turn, removes the LOW and applies a HIGH to terminal HT101 of line circuit 101. This attempts to turn ON its gate HTLSE.

The LOW from gate HS2 turns OFF gate LSE3 and drives its output HIGH. This turns ON gate LSE4 making conductor 239 LOW which turns OFF gates LSE2 and LS. This drives conductor LSE1 HIGH which causes gate LS1 (FIG. 2B) to drive conductor LSE LOW. This LOW is applied to all line circuits of this group and holds gate HTLSE OFF in line circuit 100 when terminal HT101 goes HIGH. This completes the selection of line 101 by the scanner.

The LOW on conductor LI and the resultant HIGH on conductor LIA is extended to the middle input of gate LI on FIG. 2E. The upper input of the LI gate is HIGH at this time by virtue of the LOW on conductor 239 into the LS gate as described previously. The lower input is HIGH at this time from conductor LS. Since all of its inputs are HIGH, the LI gate turns ON and applies a signal to element A of the line idle sequence circuit 232. This applies a HIGH to conductor SLIC which extends to the scanner control (220B) and the trunk bid (219) circuits. The receipt of this HIGH causes the system to select an idle trunk circuit for use on the call in a manner similar to that already described.

When the trunk circuit is selected, the code lead signals applied to the line side of the network controller identify the hunted line 101; the signals on the trunk side identify the selected trunk circuit. Element B of sequence circuit 232 generates a network enable signal which is applied over conductor NETE* to the network controller to cause it to establish a connection between line circuit 101 and the selected trunk circuit. The signal on conductor PC after the path is established advances sequence circuit 232 to its position C and also applies an output signal via gate 237 to set flip-flop 236 and via gate LSG2 to reset flip-flop LSG. Resetting the LSG flip-flop makes the LSG* lead go HIGH, gating the line scanner off the code leads 207. The "1" output of the flip-flop 236 activates element A of sequence circuit 233 which, in a manner similar to that already described, reads the calling number out of the register to the line scanner to select the calling line and then completes a network connection from the selected trunk circuit to the calling line. This completes the establishment of a speech path between the calling line circuit and hunted line circuit 101. The return of the path complete signal on conductor PC advances sequence circuit 233 to its reset position which resets the mode control. The resetting of the mode control restores all sequence circuits to their normal state.

The preceding paragraphs have described how line 101 is hunted when a call is directed to line 100 at the time line 100 is busy. The preceding description assumed that line 101 was idle and that the call originally directed to line 100 was successfully completed to line 101.

Line 101 Busy When Hunted

Let it next be assumed that line 101 is busy when it is hunted. The circuit operations proceed as before described up to the point where the LSA gate turns OFF, turns ON gate LSM, and attempts to turn ON gate LI within line circuit 101. Since the line is busy, its CO relay is operated and the ground from its make contacts inhibits gate LI and prevents output conductor LI from going LOW. Therefore, the turn-OFF of gate LSA within line circuit 101 when it is busy results in a LOW on conductor LS101 and a HIGH on conductor LI.

The HIGH on conductor LI results in a LOW on conductor LIA which extends to the middle input of gate LI on FIG. 2E. This LOW inhibits the gate and holds it in an OFF state. The LOW on its output is inverted by gate LBI and applied to the upper input of gate LB. The lower input of the LB gate is HIGH at this time by virtue of the LOW on conductor 239 into the LS gate as described previously. The LOW on conductor LS101 causes a HIGH on conductor LS which extends to the middle input of gate LB. All inputs of gate LB are now HIGH and the gate, therefore,activates element A of sequence circuit 234 which applies a signal to its output conductor 234A extending to inputs of gates HTB and HTC.

No Further Hunting Permitted

Two different call conditions may now be encountered depending upon the manner in which the line circuits are interconnected. First of all, line circuit 101 may not be equipped for further hunting and, in this case, its terminal HF101 would not be interconnected to the HT–terminal of any other line circuit. In this event, when line 101 is determined to be busy, all HT–conductors will remain HIGH, conductor HT* remains HIGH, and the HIGH turns ON gate HTA which inhibits gate HTC. The HT* HIGH signal also primes the upper input of gate HTB on FIG. 2E.

The lower input of gate HTB is currently HIGH from conductor 234A. Since its upper input is also HIGH, the gate turns ON and activates the B element of sequence circuit 234 which applies a signal to conductor SLBT. This signal (1) sets flip-flop 236 to activate the calling line select sequence circuit 233, (2) resets the flip-flop LSG, and (3) causes scanner 220 and the trunk bid circuit 219 to select a busy tone source to which the calling line may be connected since the call cannot be successfully completed at this time. Sequence circuit 233 functions in the manner already described to connect the calling line to busy tone source 222 and to reset the system to normal.

Further Hunting Permitted

Let it next be assumed that line 101 does not constitute the end of the hunting group but, instead, that its terminal HF101 is connected to HT199 as shown on FIG. 2A. This connection causes the system to attempt to route a call to line 199 whenever line 101 is busy.

The circuit operations proceed up to the point where line 101 is hunted and its LSE gate turns ON to drive its output LOW. This LOW turns OFF gate LSA to drive its output HIGH. This HIGH turns ON gate LSM to drive conductor LS101 LOW; this HIGH also attempts to turn ON gate LI, but is unable to do so since the CO relay of line circuit 101 is operated and its make contacts apply a LOW to the lower input of the LI gate. This holds output conductor LI HIGH. The LOW on the output of gate LSE also turns OFF gate H1 which turns ON gate HF and drives terminal HF101 LOW. Since this terminal is connected to terminal HT199, the LOW is now applied to conductor HT199 which extends down to the HT gate on FIG. 2B. Ths LOW is twice inverted and applied as a LOW to conductor HT* which terminates on FIG. 2E. This LOW is inverted by gate HTA which primes gate HTC by making conductor HT HIGH. The LOW on conductor HT* also causes the monopulser HMP to reset flip-flop HNT. Resetting the HNT flip-flop resets sequence circuit 235 making all its outputs normal. Since hunted line 101 is busy, gate LB on FIG. 2E is enabled as already described in the preceding paragraphs. The output of this gate enables element A of sequence circuit 234 which applies a HIGH to output conductor 234A. This HIGH extends to the upper input of gate HTC to activate it since its lower input is HIGH at this time from conductor HT*.

The output of gate HTC sets the flip-flop HNT upon the termination of the pulse from the monopulser HMP. The 1 output of the flip-flop activates element A of sequence circuit 235 which applies a HIGH to its output conductor HSA to enable the upper input of gate HS1. The lower input of this gate is currently enabled by gate HS2 which inverts the LOW now on the output conductor HS2 of element E. Since both of its inputs are enabled, gate HS1 turns ON and applies a LOW to conductor HS* which extends from FIG. 2E to FIG. 2B where the LOW is inverted by gate HS and applied as a HIGH to conductor HS. This HIGH holds gate HO ON and, thereby, holds the H flip-flop in line circuit 101 in a set state. The LSE gate of this line circuit is currently enabled so that its output is LOW to hold gate H1 OFF.

Sequence circuit 235 subsequently steps to its position B, turns ON gate LSE3, turns OFF LSE4, and turns on gate LSE2 which applies a LOW to conductor LSE1 extending to FIG. 2B. Gate LS1 inverts this LOW and applies a HIGH to conductor LSE which extends to all line circuits. This HIGH turns ON the HTLSE gate in every line circuit other than line circuit 199. The HTLSE gate of line circuit 199 does not turn ON since a LOW is currently applied to its terminal HT199 from the HF101 output of line circuit 101.

Sequence circuit 235 next steps to its position C and applies a LOW to conductor LSG1*. This signal would set flip-flop LSG, but flip-flop LSG is already set from the previous time sequence circuit 235 was used for the first hunt. Nest, the sequence circuit 235 steps to its position D and applies a LOw to its output conductor LSS*. This LOW is applied as a start scan signal to line scanner 216.

The line scanner now operates as before described and scans the line circuits until it encounters line circuit 199. At that time, the scanning potentials on codes leads T9 and U9, together with the LOW on terminal HT199, enable all inputs of gate LSE of that line circuit and cause it to turn ON. The turn-ON of this gate turns ON gate LSM which transmits a signal over conductor LS199 to the class of service detector 226 and from there over conductor LS as a stop scan signal to the line scanner. This stops the scanner in its operative position associated with line circuit 199.

The hunt sequence circuit 235 steps to its position E in response to the HIGH on conductor LS, and applies an output signal to conductor HS2 to turn ON gate HS2. The turn-ON of this gate inhibits gates HS1 and LSE3. Gate HS1 now removes the LOW from conductor HS*. This turns ON gate HS which applies a LOW to conductor HS extending to all line circuits of this line group. This LOW resets the H flip-flop of line circuit 101 and restores it to normal. Gate LSE3 now causes conductor LSE to go LOW.

Let it be assumed at this time that line circuit 199 is currently idle. In this case, its gate LI turns ON and applies a LOW to conductor LI. This LOW is inverted by gate L and applied as a HIGH to conductor LIA. The HIGH on conductor LS is applied to the lower input of gate LI and the middle input of gate LB on FIG. 2E. The HIGH on conductor LIA is extended to the middle input of the LI gate. The upper input of the LI gate is currently HIGH at this time from the ground on conductor LSE* that is inverted via gates LSE5, LSE4, and LS. All of the inputs of gate LI are now HIGH and it therefore turns ON and applies a HIGH to activate element A of the line idle sequence circuit 232. This element applies a signal to conductor SLIC which initiates the circuit actions required to select an idle trunk circuit for use on the call. In a manner already described, once this trunk circuit is selected, a connection is established between it and the newly hunted line circuit 199. Element C of sequence circuit 232 then activates the calling line select sequence circuit 233 which, as already described, reidentifies the calling line and connects it to the other network appearance of the selected trunk circuit.

The completion of the network connection from the selected trunk circuit to the calling line circuit, after line circuit 199 is hunted and found to be idle, completes the required call connection between the calling line and hunted line 199.

The immediate preceding paragraphs have assumed that line 199 is idle when hunted and that the call is therefore completed to it. Let it next be assumed that line 199 is busy when hunted. Let it also be assumed that this line constitutes the end of a hunting group. In this case, gate LB on FIG. 2E is activated upon the detection of the busy condition. This activates the line busy sequence circuit 234. The output of element A of this circuit primes both gates HTB and HTC. Since no further hunting is permitted, conductor HT* is HIGH at this time. Gate HTB now turns ON and activates element B of sequence circuit 234. In the manner similar to that already described, the activation of element B initiates the further system operations required to connect the calling line to a busy tone trunk to advise the calling party the call cannot be completed at this time.

What is claimed is:

1. In a switching system having line circuits arranged into hunting groups with the line circuits of each group being arranged in a predetermined hunting sequence, a system controller including a line scanner, code leads interconnecting said line circuits with said scanner, means responsive to the serving of a call by said system for applying signals identifying a called one of said line circuits to said code leads, means in said called line circuit responsive to said code lead signals for generating a signal indicating its current idle or busy state, additional means responsive to said code lead signals for applying a priming potential to an other line circuit in the same hunting group as said called line circuit, and means jointly responsive to said priming potential and to an indication that said called line circuit is busy for causing said scanner to apply coded scanning signals to said code leads to scan said line circuits for directing said call to said other line circuit of said group.

2. The system of claim 1 in combination with means responsive to said scanning signals and to said priming potential when said other line circuit is scanned for transmitting a signal to said controller indicating the current idle or busy state of said other line circuit, and means for extending a call connection to said other line circuit if said other line circuit is currently idle.

3. The system of claim 2 in combination with means responsive to said code lead signals when said other line circuit is scanned for applying a priming potential from said other line circuit to a third line circuit in the same hunting group as said called line circuit, means responsive to an indication that said other line circuit is busy for causing said scanner to apply coded scanning signals to said code leads to scan said line circuits, means responsive to said code lead scanning signals and to said priming potential from said other line circuit when said third line circuit is scanned for transmitting a signal to said controller indicating the current idle or busy state of said third line circuit, and means for extending a call connection to said third line circuit if it is currently idle.

4. The system of claim 3 in combination with means responsive to an indication that said third line circuit is busy for applying a priming potential to and for scanning other line circuits of said same group one at a time in sequence until an idle line circuit subsequent to said called circuit in the same group is found or until all of said other line circuits subsequent to said called line circuit are determined to be busy.

5. In a switching system having a switching network and line circuit, said line circuits being arranged in a predetermined hunting sequence, code leads connected to said line circuits, means responsive to the serving of a call by said system for applying signals identifying a called one of said line circuits to said code leads, means in said called line circuit responsive to said code lead signals for generating a signal indicating its current idle or busy state, additional means responsive to said code lead signals and exclusive of said network for applying a priming potential to an other one of said line circuits, means responsive to an indication that said called line circuit is busy for removing said signals identifying said called line circuit from said code leads, and means for applying signals to said code leads to scan said line circuits for directing said call to said other line circuit under control of said priming potential.

6. The system of claim 5 in combination with means responsive to said scanning signals and to said priming potential when said other line circuit is scanned for indicating the current idle or busy state of said other line circuit, and means for extending a call connection through said network to said other line circuit if said other line circuit is currently idle.

7. The system of claim 6 in combination with means responsive to said code lead signals when said other line circuit is scanned for applying a priming potential from said other line circuit to a third one of said line circuits, means responsive to an indication that said other line circuit is busy for applying signals to said code leads to scan said line circuits, means responsive to said code lead scanning signals and to said priming potential from said other line circuit when said third line circuit is scanned for indicating the current idle or busy state of said third line circuit, and means for extending a call connection through said network to said third line circuit if it is currently idle.

8. The system of claim 7 in combination with means responsive to an indication that said third line circuit is busy for priming and scanning other ones of said line circuits one at a time in sequence until an idle line circuit subsequent to said called line circuit in said sequence is found or until all of said other line circuits subsequent to said called line circuit are determined to be busy.

9. In a switching system, a network having line circuits connected to its line side and trunk circuits and registers connected to its trunk side, said line circuits being subdivided into groups with the line circuits within a group being arranged into a predetermined hunting sequence, a system controller including a line scanner, a set of code leads interconnecting said line circuits with said registers and said scanner, each of said line circuits being connected to a unique combination of said code leads, means responsive to the serving of a call by said system for applying signals identifying a called one of said line circuits from any one of said registers to said code leads, a bistable memory means having a reset and a set state in each of said line circuits, means in said called line circuit responsive to said signals applied to said code leads by said one register for generating a response signal indicating the current idle or busy state of said called line circuit, additional means responsive to said code lead signals for switching the memory means of said called line circuit from a reset to a set state, and means responsive to the switching of said memory means to a set state when said called line circuit is in a busy state for causing said system to apply scanning signals to said coded leads to extend said call to the next line circuit in the sequence following said called line circuit.

10. The system of claim 9 in which said last named means comprises, means responsive to the switching of said memory means to a set state for applying a priming potential to the next sequentially arranged line circuit in the same hunting group as said called line circuit, means responsive to an indication that said called line circuit is busy for applying a hunt control signal from said controller to all of said line circuits, means in said called line circuit responsive to said hunt control signal for holding its memory means in a set state, means responsive to an indication that said called line circuit is busy for removing said signals applied from said register and for applying scanning signals from said scanner to said code leads, said memory means being effective for maintaining the application of said priming potential when said signals are removed by said register from said code leads, means responsive to said scanning signals and to said priming potential when said next line circuit is scanned for transmitting a signal to said controller indicating the current idle or busy state of said next line circuit, and means for extending a call connection from one of said trunk circuits through said network to said next line circuit if it is currently idle.

11. The system of claim 10 in combination with means responsive to an indication that said next line circuit is busy for applying a priming potential to and for scanning other line circuits of said same group one at a time in sequence until an idle line circuit is found or until all of said line circuits following said called line circuit in said sequence are determined to be busy.

12. In a switching system, a switching network having line circuits connected to its line side and trunk circuits and registers connected to its trunk side, said line circuits being arranged into hunting groups, a system controller, code leads interconnecting said line circuits with said registers and said controller, means for applying signals to said code leads from said controller to identify a calling one of said line circuits requesting service, means for transmitting signals identifying said calling line circuit from said code leads to any one of said registers, means for applying signals from said one register to said code leads for selecting a called one of said line circuits, means in said called line circuit responsive to said code lead selection signals for generating a signal indicating its current idle or busy state, additional means responsive to said code lead selection signals for applying a priming potential to an other line circuit in the same hunting group as said called line circuit, means responsive to an indication that said called line circuit is busy for removing said selection signals identifying said called line circuit from said code leads, and means for causing said scanner to apply coded scanning signals to said code leads to scan said line circuits for directing said call to said other line circuit of said group under control of said priming potential.

13. The system of claim 12 in combination with means responsive to said scanning signals and to said priming potential when said other line circuit is scanned for transmitting a signal to said controller indicating the current idle or busy state of said other line circuit, means responsive to an indication that said other line circuit is currently idle for selecting an idle one of said trunk circuits for use on said call, means for subsequently gating said calling line identification signals from said one register back onto said code leads to reidentify said calling line circuit, and means for applying said code lead signals to said network for controlling the establishment of network connections between said calling line circuit and said other line circuit via said selected trunk circuit.

14. In a switching system, a switching network having line circuits connected to its line side and trunk circuits and registers connected to its trunk side, said line circuits being subdivided into groups with the lines within each group being arranged into a predetermined hunting sequence, a line scanner and a trunk scanner, a set of line side code leads interconnecting said line circuits and said registers with said line scanner, a set of trunk side code leads interconnecting said trunk circuits and said registers with said trunk scanner, means responsive to the initiation of a call at a calling one of said line circuits for applying signals to said line side code leads from said line scanner to identify said calling line circuit, means responsive to said identification for applying signals from said trunk scanner to said trunk side code leads for selecting an idle one of said registers for use on said call, means for applying said code lead signals from both sets of said leads to said network, said network being responsive to said code lead signals for establishing a network path between said calling line circuit and said selected register, means further responsive to said identification of said calling line circuit for transmitting signals identifying said calling line circuit from said line side code leads to said one register, means in said register for storing called line digits received over said path from said calling line circuit, means responsive to the serving of said call by said system for subsequently applying signals identifying a called one of said line circuits from said register to said line side code leads, a bistable memory means having a reset and a set state in each of said line circuits, means in said called line circuit responsive to said signals applied to said line side code leads by said register for generating a response signal indicating the current idle or busy state of said called line circuit, additional means responsive to said code lead signals from said register for switching the memory means of said called line circuit from a reset to a set state, and means responsive to the switching of said memory means to a set state when said called line circuit is in a busy state for causing said system to apply scanning signals to said line side code leads to extend said call to the next line circuit in the sequence following said called line circuit.

15. The system of claim 14 in which said last named means comprises, means responsive to the switching of said memory means to a set state for applying a priming potential to the next sequentially arranged line circuit in the same hunting group as said called line circuit, means responsive to an indication that said called line circuit is busy for applying a hunt control signal from said controller to all of said line circuits, means in said called line circuit responsive to said hunt control signal for holding its memory means in a set state, means responsive to an indication that said called line circuit is busy for removing said signals applied from said register and for applying scanning signals from said scanner to said line side code leads, said memory means being effective for maintaining the application of said priming potential when said signals are removed by said register from said line side code leads, means responsive to said scanning signals and to said priming potential when said next line circuit is scanned for transmitting a signal to said controller indicating the current idle or busy state of said next line circuit, means responsive to an indication that said next line circuit is currently idle for applying signals from said trunk scanner to said trunk side code leads for selecting an idle one of said trunk circuits for use on said call, means responsive to said trunk circuit selection for applying signals from said line side and trunk side code leads to said network, said network being responsive to said last named signals for establishing a network path from said next line circuit to said selected trunk circuit, means responsive to said connection to said trunk circuit for applying said calling line identification signals from said register back onto said line side code leads to reidentify said calling line circuit, and means responsive to said reidentification for applying signals from said line side and trunk side code leads to said network for controlling the establishment of a network connection between said calling line circuit and said selected trunk circuit to which said next line circuit is currently connected.

* * * * *

UNITED STATES PATENT OFFICE
CERTIFICATE OF CORRECTION

Patent No. 3,764,750 Dated October 9, 1973

Inventor(s) John J. Horenkamp; Henry A. Meise, Jr.; and George W. Taylor

It is certified that error appears in the above-identified patent and that said Letters Patent are hereby corrected as shown below:

Column 1, line 30, change "Greasom-Weimer" to --Greason-Weiner--; and line 61, delete "system", second occurrence. Column 2, line 34, change "thee" to --the--. Column 11, line 37, after "both" insert --to--. Column 14, line 54, change "truck" to --trunk--. Column 15, line 23, change "LDTZ" to --LDTQ--. Column 19, line 29, delete "a", first occurrence. Column 20, line 5, change "LW*" to --LS*--. Column 24, line 67, change "HA*" to --HS*--. Column 28, line 42, before "HT*" insert --HT. Gate HTB is inhibited by the LOW on conductor--. Column 29, line 5, change "Nest" to --Next--; line 6, change "LOw" to --LOW--; and line 11, change "codes" to --code--. Column 30, line 57, change "circuit" to --circuits--.

Signed and sealed this 25th day of June 1974.

(SEAL)
Attest:

EDWARD M.FLETCHER,JR.
Attesting Officer

C. MARSHALL DANN
Commissioner of Patents